United States Patent
Miyoshi

(10) Patent No.: US 9,313,496 B2
(45) Date of Patent: Apr. 12, 2016

(54) VIDEO ENCODER AND VIDEO ENCODING METHOD AS WELL AS VIDEO DECODER AND VIDEO DECODING METHOD

(71) Applicant: FUJITSU LIMITED, Kawasaki-shi, Kanagawa (JP)

(72) Inventor: Hidenobu Miyoshi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 340 days.

(21) Appl. No.: 14/135,731

(22) Filed: Dec. 20, 2013

(65) Prior Publication Data

US 2014/0211851 A1 Jul. 31, 2014

(30) Foreign Application Priority Data

Jan. 25, 2013 (JP) .................... 2013-012269

(51) Int. Cl.
*H04N 19/577* (2014.01)
*H04N 19/52* (2014.01)
*H04N 19/91* (2014.01)

(52) U.S. Cl.
CPC ......... *H04N 19/00721* (2013.01); *H04N 19/52* (2014.11); *H04N 19/577* (2014.11); *H04N 19/91* (2014.11)

(58) Field of Classification Search
CPC ............ H04N 19/00721; H04N 19/52; H04N 19/577; H04N 19/91
USPC .................................................. 375/240.15
See application file for complete search history.

(56) References Cited

U.S. PATENT DOCUMENTS

| 5,317,397 A | 5/1994 | Odaka et al. | |
| 2012/0195368 A1* | 8/2012 | Chien | H04N 19/52 375/240.02 |
| 2012/0230392 A1* | 9/2012 | Zheng | H04N 19/197 375/240.02 |
| 2012/0320969 A1* | 12/2012 | Zheng | H04N 19/52 375/240.02 |

(Continued)

FOREIGN PATENT DOCUMENTS

| JP | 09-139948 A | 5/1997 |
| JP | 2001-045492 A | 2/2001 |

OTHER PUBLICATIONS

B. Bross et al., "High Efficiency Video Coding (HEVC) text specification draft 8," Joint Collaborative Team on Video Coding(JCT-VC) of ITU-T SG16 WP3 and ISO/IEC JTC1/SC29/WG11, Jul. 2012.

*Primary Examiner* — Jay Patel
*Assistant Examiner* — Francis G Geroleo
(74) *Attorney, Agent, or Firm* — Fujitsu Patent Center

(57) ABSTRACT

A video encoder includes: a predictive vector selecting unit that selects candidates for a first predictive vector for predicting a motion vector in a first direction, and candidates for a second predictive vector for predicting a motion vector for a second direction; a selection information setting unit that sets first selection information for identifying the first predictive vector from among the first predictive vector candidates, and second selection information for identifying the second predictive vector from among the second predictive vector candidates; and a variable length coding unit that performs variable length coding on the first and second selection information. The video encoder applies predetermined code to the second selection information indicating that the second predictive vector candidate obtained from a motion vector in the second direction, for an encoded block corresponding to the first predictive vector is the second predictive vector.

18 Claims, 10 Drawing Sheets

(56) References Cited

U.S. PATENT DOCUMENTS

| | | | | |
|---|---|---|---|---|
| 2013/0003851 A1* | 1/2013 | Yu | ............ | H04N 19/105 375/240.16 |
| 2013/0070854 A1* | 3/2013 | Wang | ............ | H04N 19/436 375/240.16 |
| 2013/0156106 A1* | 6/2013 | Sugio | ............ | H04N 19/56 375/240.16 |
| 2013/0177082 A1* | 7/2013 | Sugio | ............ | H04N 19/51 375/240.16 |
| 2013/0301735 A1* | 11/2013 | Sugio | ............ | H04N 19/52 375/240.16 |
| 2013/0329007 A1* | 12/2013 | Zhang | ............ | H04N 19/513 348/43 |
| 2014/0219357 A1* | 8/2014 | Chuang | ............ | H04N 19/52 375/240.16 |

* cited by examiner

VIDEO ENCODER AND VIDEO ENCODING METHOD AS WELL AS VIDEO DECODER AND VIDEO DECODING METHOD

CROSS-REFERENCE TO RELATED APPLICATION

This application is based upon and claims the benefit of priority of the prior Japanese Patent Application No. 2013-012269, filed on Jan. 25, 2013, and the entire contents of which are incorporated herein by reference.

FIELD

The embodiments discussed herein are related to a video encoder and a video encoding method that encodes a coding-target picture by using information in another picture, as well as a video decoder and a video decoding method that decodes video thus encoded.

BACKGROUND

In general, the volume of video data is huge. For this reason, an apparatus that handles video data usually compresses video data by encoding the video data, when transmitting the video data to a different apparatus, or when storing the video data in a storage. Typical video coding schemes that are widely used are Moving Picture Experts Group phase 2 (MPEG-2), MPEG-4, and H.264 MPEG-4 Advanced Video Coding (H.264 MPEG-4 AVC) standardized by the International Standardization Organization/International Electrotechnical Commission (ISO/IEC).

In these coding schemes, inter-coding is employed in which a coding-target picture is encoded by using information on the coding-target picture and a preceding and/or subsequent picture of the coding-target picture. In inter-coding, a coding-target picture is divided into multiple blocks. Then, for each block, a region of a reference picture, the region being most similar to the block, is identified as a predictive block by block matching, to compensate the motion between the reference picture and a coding-target picture, the reference picture being obtained by decoding an encoded picture preceding and/or subsequent to the coding-target picture. Thereafter, the amount of spatial movement between the predictive block and the coding-target block is calculated, and thus a motion vector is obtained. By using the motion vector, the predictive block is identified in the reference picture, and information on the difference between the predictive block and the coding-target block, and the motion vector, are encoded. Hence, using the inter-coding makes it possible to exclude redundant information, and therefore generally achieves higher compression efficiency than that achieved by intra-coding, in which a coding-target picture is encoded by using information included in the coding-target picture only.

To improve accuracy in motion compensation, methods of compensating for motion by using multiple motion vectors calculated on the basis of a coding-target picture and multiple reference pictures have been developed (for example, refer to Japanese Laid-open Patent Publication No. H09-139948).

In these methods, a motion vector is generated for each block. In particular, for a bidirectional predictive picture, for which predictive blocks are generated by using two or more reference pictures, multiple prediction directions are set for a coding-target block. Moreover, a motion vector is calculated for each prediction direction. To further improve compression efficiency, it is preferable that the amount of information to be used for encoding each motion vector be reduced. In view of this, in the High Efficiency Video Coding (HEVC) under development by the ISO/IEC and the International Telecommunication Union, Telecommunication Standardization Sector (ITU-T), a predictive vector is selected for each prediction direction for a coding-target block, from among motion vectors of the respective blocks encoded before the coding-target block. Then, for each prediction direction, a difference vector and information for identifying the predictive vector are variable-length encoded, the difference vector representing, for each element, the value of the difference between the motion vector and the predictive vector, (for example, refer to B. Bross et al., "High Efficiency Video Coding (HEVC) text specification draft 8", [online], July 2012, Internet URL: http://phenix.it-sudparis.eu/jct/doc_end_user/current_document.php?id=6465 (retrieved on Nov. 27, 2012)).

SUMMARY

In the HEVC, a predictive vector is determined independently for each prediction direction. Accordingly, as for blocks to be subjected to bidirectional prediction, information to be used for encoding the predictive vector is encoded individually for each direction. This increases the amount of data to be processed when encoding predictive vectors compared with a case of referring to reference pictures only in a single direction.

According to one embodiment, a video encoder that encodes, in a bidirectional prediction mode, a coding-target block among a plurality of blocks obtained by dividing a coding-target picture included in video data is provided. The video encoder includes: a motion vector calculating unit that calculates, for the coding-target block, a first motion vector representing an amount of spatial movement between a reference region in a first reference picture positioned in a first direction from the coding-target picture and the coding-target block, and that calculates, for the coding-target block, a second motion vector representing an amount of spatial movement between a reference region in a second reference picture positioned in a second direction from the coding-target picture and the coding-target block; a predictive vector selecting unit that, from among motion vectors calculated for respective blocks encoded before the coding-target block, selects a plurality of candidates for a first predictive vector for predicting the first motion vector, and a plurality of candidates for a second predictive vector for predicting the second motion vector; a prediction error calculating unit that calculates first difference vectors representing errors between the first motion vector and respective candidates for the first predictive vector, and that calculates second difference vectors representing errors between the second motion vector and respective candidates for the second predictive vector; a selection information setting unit that sets first selection information for identifying, as the first predictive vector, a candidate corresponding to a first difference vector whose amount of information is the smallest in the first difference vectors, from among the plurality of candidates for the first predictive vector, and that sets second selection information for identifying, as the second predictive vector, a candidate corresponding to a second difference vector whose amount of information is the smallest in the second difference vectors, from among the plurality of candidates for the second predictive vector; and a variable length coding unit that performs variable length coding on the first selection information and the second selection information. The video encoder applies, on the basis of the first selection information, predetermined code to the second selection information representing that the second predictive vector is a candidate determined on the basis of a motion vector, in the second direction for the encoded block corresponding to the first predictive vector, from among the plurality of candidates for the second predictive vector.

According to another embodiment, a video decoder that decodes a decoding-target bidirectional-predictive-coded block among a plurality of blocks obtained by dividing a decoding-target picture included in encoded video data is provided. The video decoder includes: a variable length decoding unit that regenerates first selection information on a first predictive vector of a first: motion vector, and a first difference vector between the first motion vector and the first predictive vector, first motion vector representing an amount of spatial movement between the decoding-target block and a reference region in a first reference picture positioned in a first direction from the decoding-target picture, and that regenerates second selection information on a second predictive vector of a second motion vector, and a second difference vector between the second motion vector and the second predictive vector, the second motion vector representing an amount of spatial movement between the decoding-target block and a reference region in a second reference picture positioned in a second direction from the decoding-target picture; a predictive vector selecting unit that selects a plurality of candidates for the first predictive vector from among motion vectors of respective blocks decoded before the decoding-target block, identifies the first predictive vector from among the plurality of candidates for the first predictive vector, on the basis of the first selection information, selects a plurality of candidates for the second predictive vector from among the blocks decoded before the decoding-target block, and identifies the second predictive vector from among the plurality of candidates for the second predictive vector by judging, on the basis of the first selection information, whether or not the second selection information is a predetermined code indicating that a candidate determined on the basis of a motion vector in the second direction, for the decoded block corresponding to the first predictive vector from among the plurality of candidates for the second predictive vector, is the second predictive vector; and a motion vector decoding unit that decodes the first motion vector by adding the first difference vector to the first predictive vector, and the second motion vector by adding the second difference vector to the second predictive vector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A video encoder according to one embodiment will be described below with reference to the drawings. The inventors noticed that the motion vectors of the respective blocks in a region of a coding-target picture, the region including an object that is a rigid body, are approximately the same.

Figure 1A:
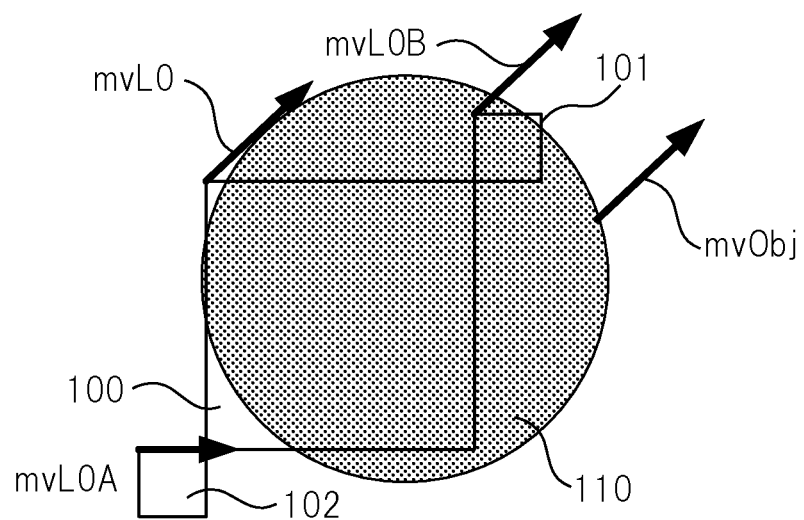
FIG. 1A is a conceptual diagram illustrating the relationship between an object on a picture and motion vectors of a coding-target block and neighboring blocks.

FIG. 1A is a conceptual diagram illustrating the relationship between an object in a picture and motion vectors of a coding-target block and neighboring blocks. An object 110 appears in a coding-target block 100 and a block 101, which is adjacent to the upper right of the coding-target block 100. By contrast, the object 110 does not appear in a block 102, which is adjacent to the lower left of the coding-target block 100. The time difference between each reference picture referred to for encoding the coding-target block 100 and the coding-target picture including the coding-target block 100 is small, i.e., less than one second. Accordingly, it is highly likely that the object 110 is considered as a rigid body that undergoes almost no changes. Accordingly, a motion vector mvL0 obtained for the coding-target block 100 and a motion vector mvL0B obtained for the block 101 are highly likely to be approximately the same as a motion vector mvObj of the object 110. On the other hand, a motion vector mvL0A obtained for the block 102 not including the object 110 is highly likely to be different from the motion vector mvL0 of the coding-target block 100. By taking these into account, when both the block 101 and the block 102 are already encoded, it is preferable that the motion vector mvL0B be selected as a predictive vector of the coding-target block 100, rather than the motion vector mvL0A. Determining the predictive vector in this way enables each element of the difference vector between the motion vector mvL0 and the predictive vector to be small. In general, the closer the value of each element of a difference vector is to 0, the more frequently the value of the element appears. For this reason, in variable length coding of difference vectors, shorter code is assigned to the value of an element, the value being closer to 0. Consequently, the closer the value of each element of a difference vector is to 0, the smaller the amount of data for encoding the motion vector mvL0 becomes.

Figure 1B:
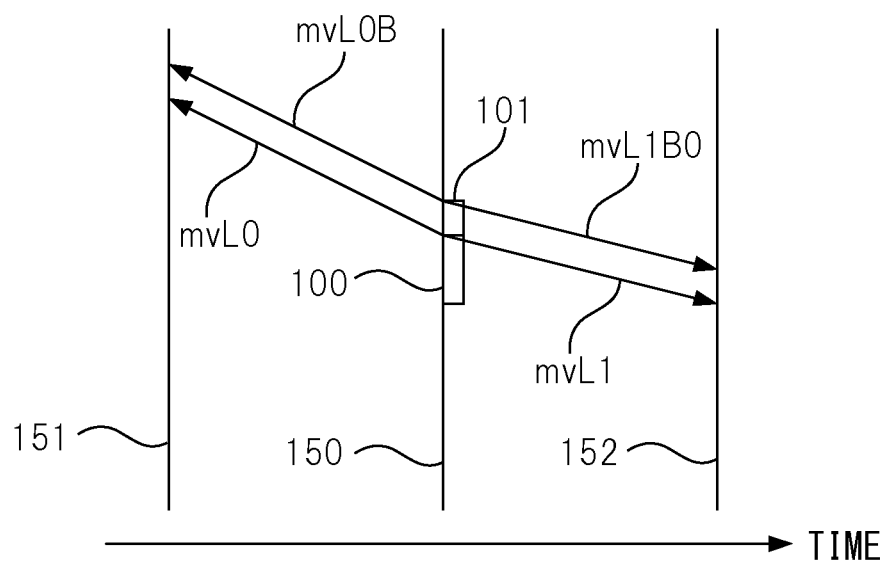
FIG. 1B is a diagram illustrating one example of motion vectors, in respective directions, of each of two blocks including the same object.

FIG. 1B is a diagram illustrating an example of motion vectors, in respective directions, of each of two blocks including the same object. In FIG. 1B, the horizontal axis represents rime. When an object appears in both the coding-target block 100 and the adjacent block 101 in a coding-target picture 150, the motion vector mvL0 of the coding-target block 100 is approximately the same as the motion vector mvL0B of the block 101. Note that each of the motion vectors mvL0 and mvL0B refers to a reference picture 151 preceding the coding-target picture 150 in terms of time. In addition, as mentioned above, the time difference between a reference picture and a coding-target picture is small, i.e., less than one second, the shape of an object in the pictures changes very little. Accordingly, a motion vector mvL1 of the coding-target block 100 obtained by referring to a reference picture 152 subsequent to the coding-target picture 150 in terms of time, is also likely to be approximately the same as a motion vector mvL1B of the block 101.

In view of the above, in this embodiment, the video encoder performs variable length coding on selection information for identifying a predictive vector, in each direction, of a motion vector, for each coding-target block to be subjected to bidirectional predictive coding. Moreover, after adopting the motion vector, in one direction of a block as a predictive vector of the coding-target block, the video encoder applies the same code to the selection information that identifies, as a predictive vector, the motion vector in the other direction, of the block whose motion vector in the one direction is adopted as a predictive vector of the coding-target block. In this way, the video encoder increases the probability that the selection information of the predictive vector in the other direction has the same code as the selection information of the predictive vector in the one direction. This reduces the amount of data to be processed when encoding the motion vectors. For the sake of convenience, in the following, a direction for which a predictive vector of a motion vector of each coding-target block to be subjected to bidirectional predictive coding is obtained first is referred to as an L0 direction, and a direction for which a predictive vector is obtained later is referred to as an L1 direction.

In addition, a picture may be a frame or a field. A frame is a single still image included in video data, while a field is a still image obtained by extracting only data in odd-numbered lines or data in even-numbered lines from a frame.

Video data is encoded on a group-of-pictures (GOP)-by-GOP basis. The GOP is a structure including multiple successive pictures and having a coding mode specified for each picture. In the following, among the pictures included in each GOP, a picture to be inter-coded by using information on a single picture that is already encoded is referred to as a P picture. Moreover, a picture to be subjected to bidirectional predictive coding by using information on two pictures that are already encoded is referred to as a B picture. One of the two reference pictures referred to by the B picture may be preceding the B picture in terms of time, and the other one may be subsequent to the B picture in terms of time. In this case, the L0 direction corresponds to the forward direction from the coding-target picture in terms of time, while the L1 direction corresponds to the backward direction from the coding-target picture in terms of time. Alternatively, both of the two reference pictures may be pictures preceding the B picture in terms of time. In this case, both the L0 direction and the L1 direction correspond to the forward direction from the coding-target picture in terms of time. Further, both of the two reference pictures may be pictures subsequent to the B picture in terms of time. In this case, both the L0 direction and the L1 direction correspond to the backward direction from the coding-target picture in terms of time. Further, a picture to be subjected only to intra-coding and not to inter-coding is referred to as an I picture.

Figure 2:
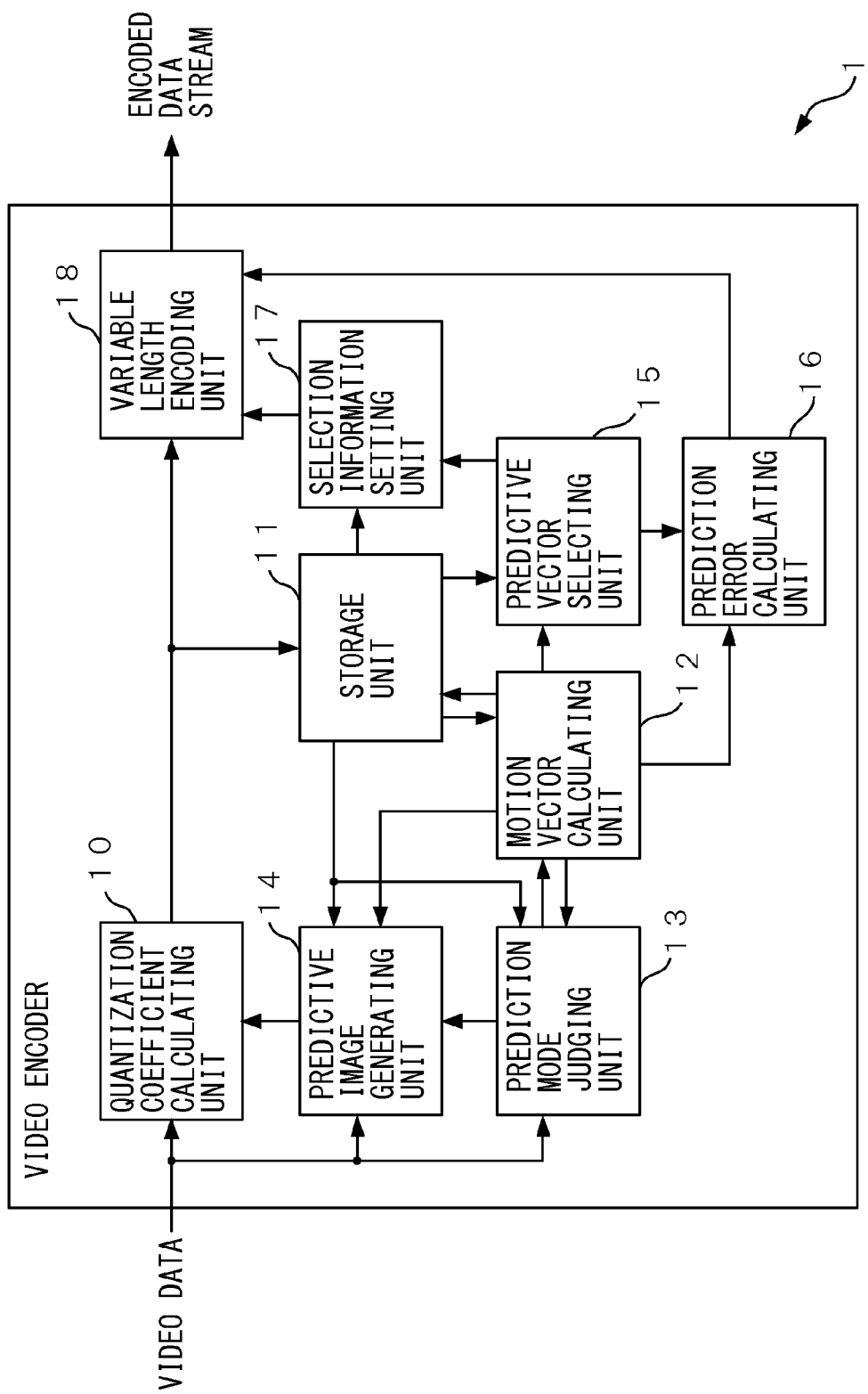
FIG. 2 is a diagram illustrating in simplified form the configuration of a video encoder according to one embodiment.

FIG. 2 is a diagram illustrating in simplified form the configuration of the video encoder according to one embodiment. A video encoder 1 includes a quantization coefficient calculating unit 10, a storage unit 11, a motion vector calculating unit 12, a prediction mode judging unit 13, a predictive image generating unit 14, a predictive vector selecting unit 15, a prediction error calculating unit 16, a selection information setting unit 17, and a variable length coding unit 18. These units included in the video encoder 1 are formed individually as separate circuits. Alternatively, each unit included in the video encoder 1 may be mounted on the video encoder 1, as a single integrated circuit with the circuits corresponding to the respective units, integrated therein. Further, the units included in the video encoder 1 may be function modules that are implemented by a computer program executed on a processor included in the video encoder 1.

A coding-target picture is divided into multiple blocks each having a predetermined number of pixels, by a control unit (not illustrated) that controls the entire video encoder 1, for example. Each block is set, for example, to a size in the range of four pixels horizontally by four pixels vertically to 64 pixels horizontally by 64 pixels vertically. Then, the blocks are inputted to the video encoder 1 in the order defined in B. Bross et al., "High Efficiency Video Coding (HEVC) text specification draft 8", [online], July 2012, Internet URL: http://phenix.it-sudparis.eu/jct/doc_end_user/current_document.php?id-6465 (retrieved on Nov. 27, 2012), or the order defined in H.264 MPEG-4 AVC, for example.

The quantization coefficient calculating unit 10 performs difference operation between a coding-target block and a predictive block generated by the predictive image generating unit 14. Then, the quantization coefficient calculating unit 10 generates a prediction error signal on the basis of each of the difference values thus calculated and corresponding to the respective pixels of the blocks.

The quantization coefficient calculating unit 10 performs orthogonal transform on each prediction error signal of the coding-target block, and thereby obtains a frequency signal representing the horizontal frequency component and the vertical frequency component of the prediction error signal. For example, the quantization coefficient calculating unit 10 performs, as an orthogonal transform process, the discrete cosine transform (DCT) on the prediction error signal, and thereby obtains a set of DCT coefficients for each block, as frequency signal.

Subsequently, the quantization coefficient calculating unit 10 calculates the quantization coefficient of the frequency signal by quantizing the frequency signal. This quantization process represents the signal values in a certain section of the frequency signal by a single signal value, which is referred to is a quantization width. For example, the quantization coefficient calculating unit 10 quantizes the frequency signal by discarding a predetermined number of lower bits of the frequency signal, the lower bits corresponding to the quantization width. The quantization width is determined on the basis of a quantization parameter. The quantization coefficient calculating unit 10 determines the quantization width to be used, according to a function representing the value of the quantization width corresponding to the quantization parameter value. The function may be a monotone increasing function with respect to the quantization parameter value, and is set in advance.

Alternatively, multiple quantization matrices may be prepared in advance that define quantization widths corresponding to the respective horizontal and vertical frequency components, and may be stored in a memory included in the quantization coefficient calculating unit 10. In this case, the quantization coefficient calculating unit 10 selects a particular quantization matrix from the stored quantization matrices, on the basis of a quantization parameter. The quantization coefficient calculating unit 10 may determine a quantization width for each frequency component of the frequency signal by referring to the selected quantization matrix.

The quantization coefficient calculating unit 10 may determine a quantization parameter in accordance with any one of various quantization parameter determination methods conforming to the video coding standard described in B. Bross et al., "High Efficiency Video Coding (HEVC) text specification draft 8", [online], July 2012, Internet UPL: http://phenix.it-sudparis.eu/jct/doc_end_user/current_document.php?id=6465 (retrieved on Nov. 27, 2012) mentioned above, or other video coding standards such as MPEG-4 and H.264 MPEG-4 AVC. The quantization coefficient calculating unit 10 may use a quantization parameter calculation method adopted in MPEG-2 Standard Test Model 5, for example. For details on the quantization parameter calculation method adopted in MPEG-2 Standard Test Model 5, refer to the URL, http://www.mpeg.org/MPEG/MSSG/tm5/Ch10/Ch10.html, for example.

By executing the quantization process, the quantization coefficient calculating unit 10 enables a reduction of the number of bits used for representing each frequency component of the frequency signal, consequently reducing the amount of information of the coding-target block. The quantization coefficient calculating unit 10 outputs the quantization coefficients to the variable length coding unit 18.

Moreover, on the basis of the quantization coefficients of the coding-target block, the quantization coefficient calculating unit 10 generates a reference picture to be used when encoding a block subsequent to the current coding-target block. To generate a reference picture, first, the quantization coefficient calculating unit 10 performs inverse quantization on each of the quantization coefficients by multiplying the quantization coefficient by a predetermined number corresponding to the quantization width determined by the parameter. By this inverse quantization, the frequency signals, e.g., the set of DCT coefficients, of the coding-target block are reconstructed. Thereafter, the quantization coefficient calculating unit 10 performs an inverse orthogonal transform process on the frequency signals. For example, when calculating the frequency signals by the DCT, the quantization coefficient calculating unit 10 performs an inverse DCT process on the reconstructed frequency signals. By performing the inverse quantization process and the inverse orthogonal transform process on each quantized signal, a prediction error signal having information comparable with that included in the corresponding prediction error signal before being encoded is regenerated.

The quantization coefficient calculating unit 10 adds, to the value of each pixel of the predictive block, the regenerated prediction error signal corresponding to the pixel. By performing these processes on each block, the quantization coefficient calculating unit 10 generates a reference block to be used when generating a predictive block for a block to be encoded later. Every time the quantization coefficient calculating unit 10 generates a reference block, the quantization coefficient calculating unit 10 stores the reference block in the storage unit 11.

The storage unit 11 temporarily stores the reference block received from the quantization coefficient calculating unit 10. A reference picture is obtained by combining reference blocks corresponding to a single picture, in the order of encoding the blocks. The storage unit 11 provides the reference picture or each corresponding reference block to the motion vector calculating unit 12, the prediction mode judging unit 13, and the predictive image generating unit 14. The storage unit 11 stores a predetermined number of reference pictures that have a possibility of being referred to by a coding-target picture, and discards the reference pictures in order from the one encoded first when the number of reference pictures exceeds the predetermined number.

Moreover, the storage unit 11 stores the motion vector of each inter-coded reference block. The storage unit 11 provides the motion vectors to the predictive vector selecting unit 15.

The motion vector calculating unit 12 calculates a motion vector by using the coding-target block and the reference picture, to generate a predictive block to be used in inter-coding. The motion vector represents the amount of spatial movement between the coding-target block and a region in the reference picture, the region being the most similar to the coding-target block.

The motion vector calculating unit 12 identifies the reference picture including the region that is the most similar to the coding-target block and the position of the region in the reference picture, by performing block matching between the coding-target block and the reference picture.

The motion vector calculating unit 12 obtains a motion vector on the basis of the horizontal and vertical movement amounts between the positions of the coding-target block in the coding-target picture and the region, in the reference picture, that is the most similar to the coding-target block. The motion vector calculating unit 12 passes the obtained motion vector and the identification information of the reference picture to the storage unit 11, the prediction mode judging unit 13, the predictive image generating unit 14, and the prediction error calculating unit 16.

The prediction mode judging unit 13 determines a prediction mode that specifies a method of generating a predictive block for the coding-target block. The prediction mode judging unit 13 determines a prediction mode for the block on the basis of information that is obtained from the control unit (not illustrated) and that indicates the type of the coding-target picture including the coding-target block, for example. When the type of the coding-target picture is I picture, the prediction mode judging unit 13 selects the intra-coding mode as a prediction mode to be applied to the block.

Moreover, when the type of the coding-target picture is P picture, the prediction mode judging unit 13 selects either the inter-coding mode or the intra-coding mode as a prediction mode to be applied to the block, for example. When the inter-coding mode is selected, the prediction mode judging unit 13 determines whether a forward prediction mode, in which a preceding picture in terms of time is referred to, is selected or a backward prediction mode, in which a subsequent picture in terms of time is referred to, is selected, on the basis of information indicating the position of the coding-target picture in the GOP. Further, when the type of the coding-target picture is B picture, the prediction mode judging unit 13 selects a prediction mode to be applied to the block, from among the intra-coding mode, the forward prediction mode, the backward prediction mode, and the bidirectional prediction mode.

When determining one prediction mode from multiple prediction modes, the prediction mode judging unit 13 calculates, for each of the prediction modes, the cost, which is an evaluation value of the amount of data to be encoded for the block. Thereby, the prediction mode judging unit 13 determines the prediction mode having the minimum cost, as a prediction mode to be applied to the coding-target block.

The cost for each of the modes is calculated as follows, for example.

$$costf = \sum_{i,j} |org_{i,j} - ref_{i,j}| + \lambda * (\text{Table}[mv1 - premv1]) \quad (1)$$

$$costb = \sum_{i,j} |org_{i,j} - ref_{i,j}| + \lambda * (\text{Table}[mv1 - premv1])$$

$$costbi = \sum_{i,j} |org_{i,j} - ref_{i,j}| +$$

$$\lambda * (\text{Table}[mv1 - premv1] + \text{Table}[mv2 - premv2])$$

$$costi = \sum_{i,j} |org_{i,j} - AveMB|$$

In equations (1), costf, costb, costbi, and costi denote the respective costs corresponding to the forward prediction mode, the backward prediction mode, the bidirectional prediction mode, and the intra-coding mode. In addition, $org_{i,j}$ denotes the pixel values of a horizontal coordinate i and a vertical coordinate j included in the coding-target block, and $ref_{i,j}$ denotes the pixel values of a horizontal coordinate i and a vertical coordinate j included in a predictive image. The prediction mode judging unit 13 generates a predictive block on the basis of the reference picture in accordance with a similar method to that used by the predictive image generating unit 14. Moreover, each of mv1 and mv2 denotes a motion vector obtained for the coding-target block, and each of premv1 and premv2 denotes a motion vector obtained for the block that is encoded immediately before the coding-target block. Further, Table[a,b] outputs an estimated code amount corresponding to the difference vector between a vector a and a vector b. For example, Table[a,b] may be a reference table presenting the estimated code amounts of various difference vectors. Furthermore, λ denotes a weight constant, and is set at 1, for example. AveMB denotes the average value of the values of the pixels included in the coding-target block.

The prediction mode judging unit 13 calculates the cost of each of the selection-target prediction modes, in accordance with equations (1). Then, the prediction mode judging unit 13 selects the prediction mode having the minimum cost, as a prediction mode to be applied to the coding-target block.

The prediction mode judging unit 13 notifies the predictive image generating unit 14 of the selected prediction mode.

The predictive image generating unit 14 generates a predictive block in accordance with the prediction mode selected by the prediction mode judging unit 13. When the coding-target block is inter-coded by the forward prediction mode or the backward prediction mode, the predictive image generating unit 14 performs motion compensation on the reference picture obtained from the storage unit 11, on the basis of the motion vector provided by the motion vector calculating unit 12. Thereby, the predictive image generating unit 14 generates a motion-compensated predictive block to be used in inter-coding. Motion compensation is a process of shifting the position of the region in the reference picture, the region being the most similar to the coding-target block, so that the position deviation amount between the coding-target block and the most-similar region in the reference picture, the position deviation amount being expressed by the motion vector, would be compensated.

When the coding-target block is inter-coded in accordance with the bidirectional prediction mode, the predictive image generating unit 14 performs motion compensation on each of the regions of the reference pictures, the regions being specified by the respective two motion vectors, on the basis of the corresponding one of the motion vectors. Then, the predictive image generating unit 14 generates a predictive block by averaging the values of each two corresponding pixels of the two compensated images obtained through the motion compensation. Alternatively, the predictive image generating unit 14 may generate a predictive block by calculating the weighted average of the values of each two corresponding pixels of the two compensated images by multiplying each of the values of each two corresponding pixels by a weighting factor. The smaller the time difference between the corresponding reference picture and the coding-target picture is, the larger the weighting factor becomes.

When the coding-target block is intra-coded, the predictive-image generating unit 14 generates a predictive block on the basis of a block adjacent to the coding-target block. In this case, the predictive image generating unit 14 generates a predictive block in accordance with one of the modes defined, for example, in H.264 MPEG-4 AVC, such as the horizontal mode, the DC mode, and the plane mode. The predictive image generating unit 14 passes the generated predictive block to the quantization coefficient calculating unit 10.

The predictive vector selecting unit 15, the prediction error calculating unit 16, and the selection information setting unit 17 carry out a process for encoding each motion vector.

The predictive vector selecting unit 15 selects a predictive vector to be used for predicting a motion vector of the coring-target block, from among the motion vectors of the encoded blocks. In this embodiment, the predictive vector selecting unit 15 selects a predictive vector in accordance with the Adaptive Motion Vector Prediction (AMVP), which is a predictive vector selection scheme defined in the HEVC. In other words, the predictive vector selecting unit 15 creates a list of two predictive vector candidates, and then obtains a flag indicating one of the predictive vectors that is to be adopted from the list.

The predictive vector selecting unit 15 carries out the following process for each of the L0 direction and the L1 direction, in the forward prediction, the backward prediction, and the bidirectional prediction. In the following, description will be given of selecting a predictive vector in one direction.

Figure 3:
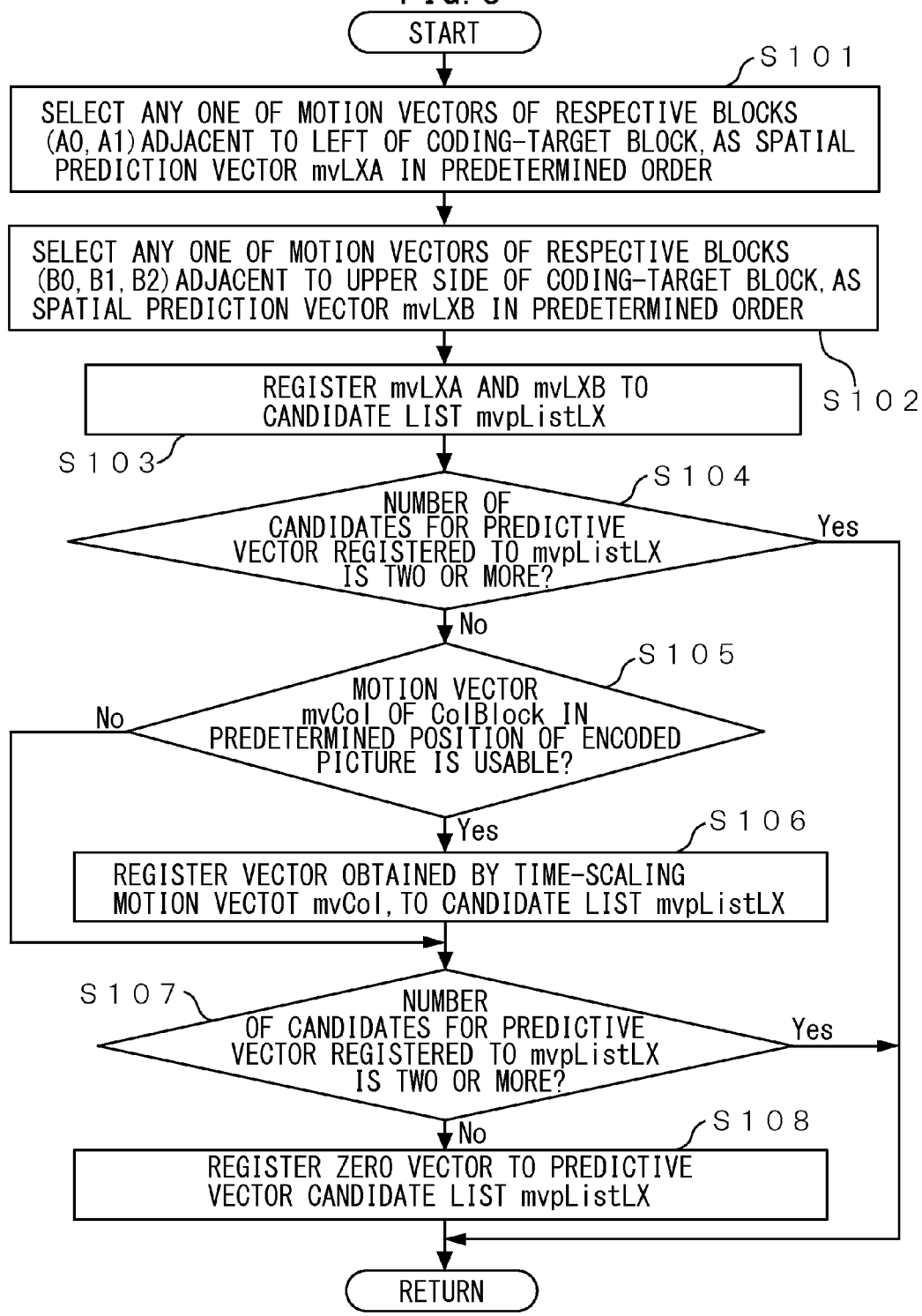
FIG. 3 is a flowchart illustrating steps for creating a predictive vector candidate.

FIG. 3 is a flowchart illustrating the steps for creating a predictive vector candidate list, which is performed by predictive vector selecting unit 15. First, the predictive vector selecting unit 15 selects predictive vector candidates from the motion vectors of the encoded blocks adjacent to the coding-target block. In the following, each predictive vector candidate selected from the motion vectors of the respective blocks adjacent to the coding-target block will be referred to as a spatial prediction vector.

Specifically, the predictive vector selecting unit 15 selects each of the motion vectors of the respective blocks adjacent to the left of the coding-target block, as a spatial prediction vector mvLXA, in a predetermined order (Step S101).

Figure 4:
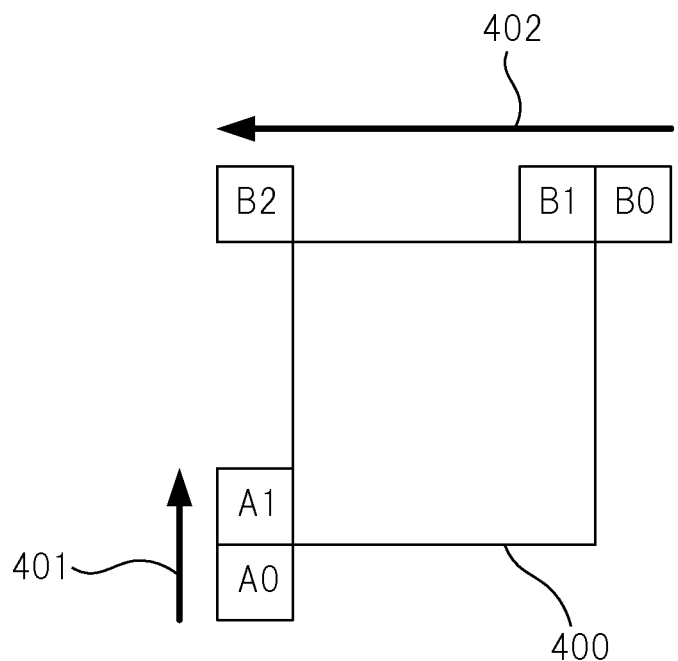
FIG. 4 is a diagram illustrating an order of registering spatial prediction vectors.

With reference to FIG. 4, a process of selecting spatial prediction vectors will be described in detail. FIG. 4 is a diagram illustrating an order of registering spatial prediction vectors. The predictive vector selecting unit 15 judges for a coding-target block 400 whether or not to register, as a spatial prediction vector, the motion vector of each of a block A0, which is adjacent to the lower left of the coding-target block 400, and a block A1, which is adjacent to the upper side of the block A0, in this order as indicated by an arrow 401.

The predictive vector selecting unit 15 judges whether or not the block A0 is already encoded. When the block A0 is already encoded, the predictive vector selecting unit 15 judges whether or not the block A0 is inter-coded in the same direction as that in which the coding-target block 400 is to be inter-coded. When the block A0 is inter-coded in the same direction as that of the coding-target block 400, the predictive vector selecting unit 15 judges whether or not a reference picture refIdxLXA0 of the block A0 is the same as a reference picture refIdxLX of the coding-target block 400. When the reference picture refIdxLXA0 is the same as the reference picture refIdxLX, the predictive vector selecting unit 15 selects the motion vector of the block A0 as a first spatial prediction vector mvLXA.

On the other hand, when the block A0 is not encoded yet, or when the reference picture refIdxLXA0 differs from the reference picture refIdxLX, the predictive vector selecting unit 15 carries out the same judgment process for the block A1. When the block A1 is already encoded and a reference picture refIdxLXA1 referred to by the block A1 is the same as the reference picture refIdxLX, the predictive vector selecting unit 15 selects the motion vector of the block A1 as the spatial prediction vector mvLXA.

When neither the reference picture refIdxLXA0 and the reference picture refIdxLXA1 differ from the reference picture refIdxLX and the block A0 is inter-coded in the same direction as that of the coding-target block 400, the predictive vector selecting unit 15 selects the motion vector of the block A0. Then, the predictive vector selecting unit 15 multiplies the motion vector of the block A0 by the ratio of the time difference between a coding-target picture including the coding-target block 400 and the reference picture refIdxLX to the time difference between the coding-target picture and the reference picture refIdxLXA0. The predictive vector selecting unit 15 selects the vector thus obtained, as the spatial prediction vector mvLXA.

When the spatial prediction vector mvLXA is not obtained by the above process and the block A1 is inter-coded in the same direction as that of the coding-target block 400, the predictive vector selecting unit 15 selects the motion vector of the block A1. Then, the predictive vector selecting unit 15 multiplies the motion vector of the block A1 by the ratio of the time difference between the coding-target picture and the reference picture refIdxLX to the time difference between the coding-target picture and the reference picture refIdxLXA1. The predictive vector selecting unit 15 selects the vector thus obtained, as the spatial prediction vector mvLXA. When neither the block A0 nor the block A1 is inter-coded in the same direction as that of the coding-target block 400, no vector is selected as the spatial prediction vector mvLXA.

Next, the predictive vector selecting unit 15 selects the motion vector of each of the blocks adjacent to the upper side of the coding-target block, as a spatial prediction vector mvLXB, in a predetermined order (Step S102).

By referring to FIG. 4 again, the predictive vector selecting unit 15 carries out a similar selection process to that for the blocks A0 and A1, on each of blocks B0, B1, and B2 adjacent to the upper side of the coding-target block 400, in the order indicated by an arrow 402. Then, the predictive vector selecting unit 15 judges, for each of the blocks B0 to B2, whether or not to select the motion vector of the block as the spatial prediction vector mvLXB. The block B0 is adjacent to the upper right of the coding-target block 400, and the block B1 is adjacent to the left of the block B0. The block B2 is adjacent to the upper left of the coding-target block 400.

Specifically, the predictive vector selecting unit 15 selects, as the spatial prediction vector mvLXB, the motion vector of the first one of the blocks B0 to B2 in this order, when the reference picture of the block is the same as the reference picture refIdxLX of the coding-target block 400. On the other hand, when the reference pictures of the blocks B0 to B2 differ from the reference picture refIdxLX, the predictive vector selecting unit 15 identifies the block whose motion vector is obtained first among the blocks B0 to B2 in this order. Then, the predictive vector selecting unit 15 selects, as the spatial prediction vector mvLXB, a vector obtained by multiplying the motion vector of the block thus obtained by the ratio of the time difference between the coding-target picture and the reference picture refIdxLX to the time difference between the reference picture referred to by the identified block and the coding-target picture.

When none of the blocks B0 to B2 is inter-coded in the same direction as that of the coding-target block 400, the predictive vector selecting unit 15 substitutes the spatial prediction vector mvLXA for the spatial prediction vector mvLXB. In this case, when the spatial prediction vector mVLXA is not selected, the spatial prediction vector mvLXB is not selected, either.

The predictive vector selecting unit 15 registers the spatial prediction vectors mvLXA and mvLXB to a predictive vector candidate list mvpListLX (Step S103). When the spatial prediction vector mvLXA and the spatial prediction vector mvLXB are the same, the predictive vector selecting unit 15 deletes the spatial prediction vector mvLXB from the candidate list mvpListLX.

The predictive vector selecting unit 15 judges whether or not the number of predictive vector candidates registered to the candidate list mvpListLX is two or more (Step S104). When the number of the predictive vector candidates registered to the candidate list mvpListLX is two or more (Yes in Step S104), the predictive vector selecting unit 15 terminates the process of creating the predictive vector candidate list mvpListLX. On the other hand, when the number of the predictive vector candidates registered to the candidate list mvpListLX is less than two (No in Step S104), the predictive vector selecting unit 15 selects a block ColBlock, which is in a predetermined position in each encoded picture. Then, the predictive vector selecting unit 15 judges whether or not a motion vector mvCol of the ColBlock is usable as a predictive vector candidate (Step S105). In the following, a predictive vector candidate selected from among the motion vectors of the ColBlock in each encoded picture will be referred to as a temporal prediction vector.

Figure 5:
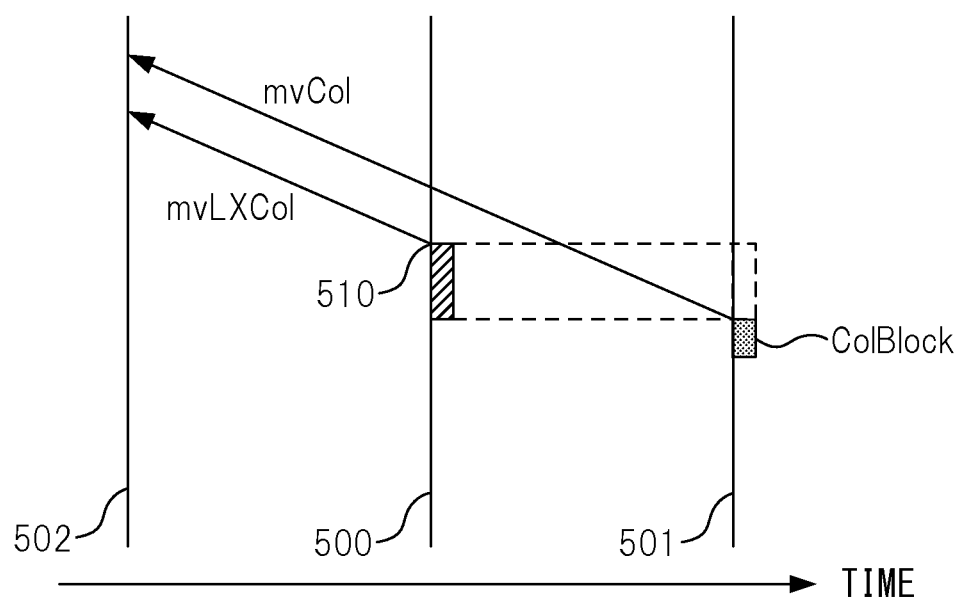
FIG. 5 is a conceptual diagram illustrating temporal prediction vector.

With reference to FIG. 5, selection of a temporal prediction vector will be described in detail. In FIG. 5, the horizontal axis represents time. The predictive vector selecting unit 15 selects a picture 501 as a candidate, from encoded pictures that have a possibility of being referred to by a coding-target block 510. Then, the predictive vector selecting unit 15 identifies the ColBlock that is adjacent to (e.g., adjacent to the lower right of) a block in the same position as the coding-target block 510 in the picture 501. When the motion vector mvCol of the ColBlock refers to a reference picture 502 referred to by the motion vector mvLXCol of the coding-target block 510, the predictive vector selecting unit 15 judges that the motion vector mvCol is usable.

When the motion vector mvCol is usable (Yes in Step S105), the predictive vector selecting unit 15 registers, to the candidate list mvpListLX, a vector obtained by time-scaling the motion vector mvCol, as a temporal prediction vector (Step S106). Specifically, the predictive vector selecting unit 15 multiplies the motion vector mvCol by the ratio of the time difference between a coding-target picture 500 including the coding-target block 510 and the reference picture 502 to the time difference between the picture 501 and the reference picture 502.

When none of the blocks ColBlock of all the encoded pictures that have a possibility of being referred to by the coding-target block 510 is inter-coded, a temporal prediction vector is not selected. On the other hand, when there are more than two candidates for the ColBlock in the encoded pictures, the predictive vector selecting unit 15 may select the motion vector of the ColBlock in the picture that is the closest to the coding-target picture 500, for example.

After Step S106, or when the motion vector mvCol is judged not to be usable in Step S105 (No in Step S105), the predictive vector selecting unit 15 judges whether or not the number of the predictive vector candidates registered to the candidate list mvpListLX is two or more (Step S107). When the number of the predictive vector candidates registered to the candidate list mvpListLX is two or more (Yes in Step S107), the predictive vector selecting unit 15 terminates the process of creating the predictive vector candidate list. On the other hand, when the number of the predictive vector candidates registered to the candidate list mvpListLX is less than two (No in Step S107), the predictive vector selecting unit 15 registers, to the candidate list mvpListLX, a zero vector as a predictive vector candidate (Step S108). A zero vector is a vector whose value of an element representing a horizontal movement amount and value of an element representing a vertical movement amount are both zero.

The predictive vector selecting unit 15 notifies the prediction error calculating unit 16 and the selection information setting unit 17 of the candidate list mvpListLX.

The prediction error calculating unit 16 calculates a difference vector between the motion vector and each of the predictive vector candidates registered to the candidate list mvpListLX. Then, the prediction error calculating unit 16 outputs a difference vector whose amount of information is the minimum, to the variable length coding unit 18, and also notifies the selection information setting unit 17 of the predictive vector candidate corresponding to a difference vector whose amount of information is the minimum. The amount of information on a difference vector is represented by the sum of the absolute values of the respective elements of the difference vector or the sum of the squares of the respective elements of the difference vector, for example.

The selection information setting unit 17 sets selection information indicating that the predictive vector candidate corresponding to the difference vector whose amount of information is the minimum is the predictive vector, and then outputs the selection information to the variable length coding unit 18.

When the coding-target block is to be subjected to forward prediction or backward prediction, the selection information setting unit 17 sets a flag mvpLXflag indicating the position, in the candidate list mvpListLX, of the predictive vector candidate corresponding to the difference vector whose amount of information is the minimum. The flag mvpLXflag is set at "0" when the first vector in the candidate list mvpListLX is the predictive vector, and is set at "1" when the second vector in the candidate list mvpListLX is the predictive vector, for example.

When the coding-target block is to be subjected to bidirectional prediction, the selection information setting unit 17 sets a flag mvpL0flag, and then outputs the flag mvpL0flag to the variable length coding unit 18, for the L0 direction in which the predictive vector is determined first, as in the case of forward prediction and backward prediction. On the other hand, for the L1 direction in which the predictive vector is determined subsequent to the L0 direction, the selection information setting unit 17 rearranges the predictive vector candidates registered to a L1-direction prediction vector candidate list mvpListL1, on the basis of the L0-direction predictive vector. In this embodiment, the selection information setting unit 17 rearranges the predictive vector candidates so that the L1-direction motion vector of the block corresponding to the L0-direction predictive vector would appear first in the candidate list mvpListL1. Then, the selection information setting unit 17 sets the flag mvpL1flag so as to indicate the predictive vector candidate corresponding to the difference vector whose amount of information is the minimum among the predictive vector candidates in the rearranged candidate list mvpListL1.

For example, by referring to FIG. 1A again, the L0-direction motion vectors mvL0A and mvL0B are calculated respectively for the blocks A0 and B0. Accordingly, the L0-direction predictive vector candidate list mvpListL0 may be as follows, for example.

{mvL0A, mvL0B}

Since the same object appears in the block B0 and the coding-target block, the motion vector mvL0B is selected as the predictive vector. Then, the selection information setting unit 17 changes the vector arrangement in the L1-direction predictive vector candidate list mvpListL1 so that the motion vector mvL1B of the block B0 would appear first, as follows.

{mvL1B, mvLiA}

By the process of rearranging the L1-direction candidate vectors in the candidate list mvpListL1 by the selection information setting unit 17, the possibility that the first vector in the candidate list is the predictive vector increases. Consequently, the possibility that the value of the flag mvpL1flag indicating the L1-direction predictive vector would be "0" is higher than the possibility that the value would be "1". The value of the flag mvpL1flag serving as selection information corresponds to a value to be encoded by the variable length coding unit 18. Accordingly, when the flag mvpL1flag serving as selection information is to be arithmetic coded, the amount of code applied to the flag mvpL1flag is smaller than one bit, when the entire video is taken into account, as will be described later. Hence, the amount of code applied to the flag mvpL1flag is smaller in this case than that when the L0-direction flag mvpL0flag and the L1-direction flag mvpL1flag are encoded independently.

The variable length coding unit 18 performs variable length coding so that the quantization coefficient received from the quantization coefficient calculating unit 10 would be shorter for a signal value having a higher occurrence probability. In addition, the variable length coding unit 18 performs variable length coding on the predictive vector selection information received from the selection information setting unit 17 and the difference vector received from the prediction error calculating unit 16. The variable length coding unit 18 may employ, as a variable length coding process, a Huffman coding process such as context-based adaptive variable length coding (CAVLC) or an arithmetic coding process such as context-based adaptive binary arithmetic coding (CABAC). It is particularly preferable that the variable length coding unit 18 perform arithmetic coding on the predictive vector selection information. In this way, the variable length coding unit 18 makes it possible for the number of bits assigned to the L1-direction predictive vector selection information of each block to be subjected to bidirectional prediction would be less than one, when the entire video is taken into account.

The video encoder 1 generates a data stream including encoded video data, by adding predetermined information such as the prediction mode for each block, to the encoded signal generated by the variable length coding unit 18. The video encoder 1 stores the data stream in a storage unit (not illustrated) including a magnetic recording medium, an optical recording medium, or a semiconductor memory, or outputs the data stream to another equipment.

Figure 6:
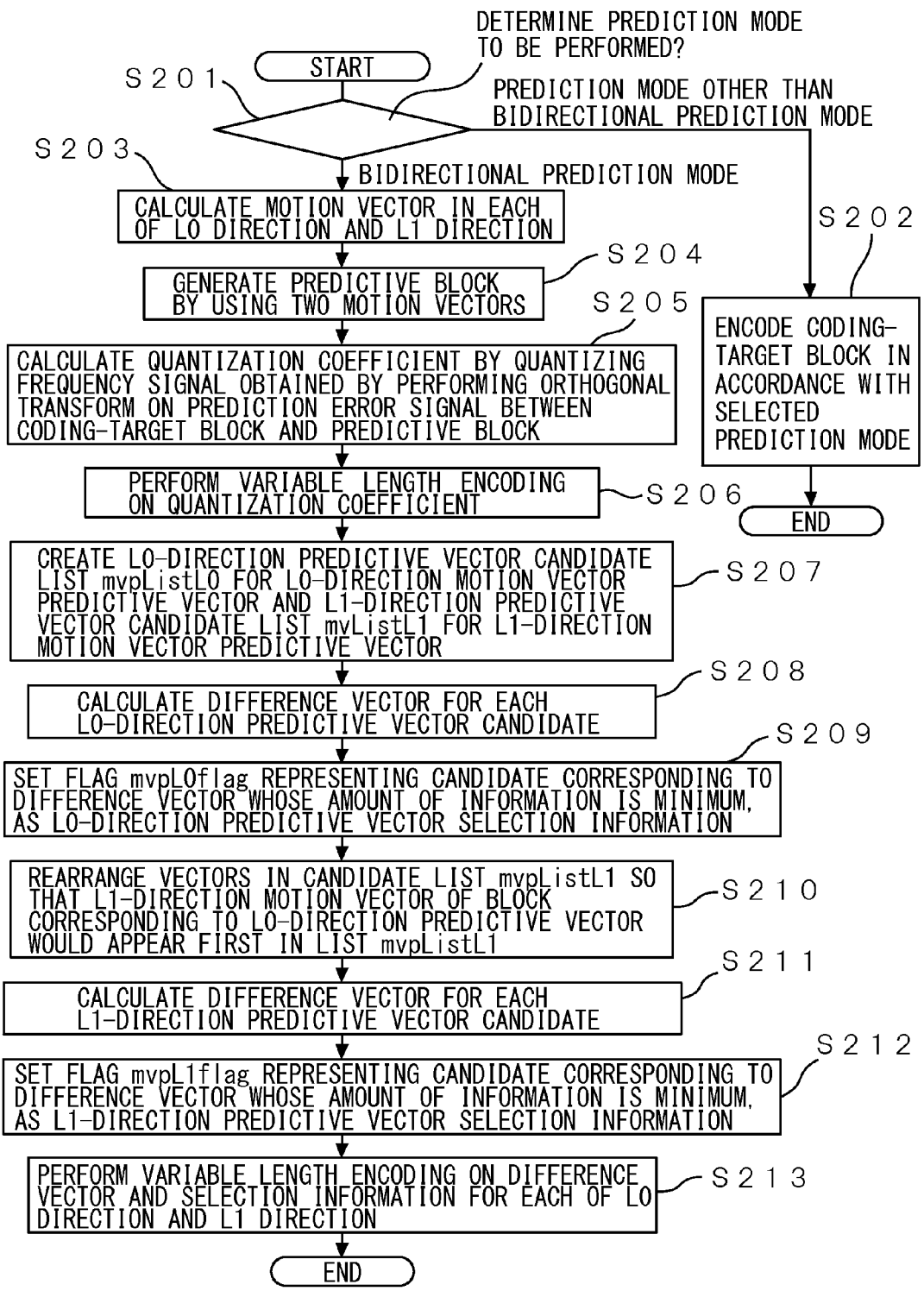
FIG. 6 is an operation flowchart illustrating a video encoding process.

FIG. 6 is an operation flowchart illustrating a video encoding process carried out by the video encoder 1. The video encoder 1 carries out the video encoding process illustrated in FIG. 6, for each block.

The prediction mode judging unit 13 determines a prediction mode for a coding-target block (Step S201). When the prediction mode is determined to be a mode other than the bidirectional mode, the video encoder 1 encodes the coding-target block in accordance with the determined prediction mode (Step S202).

On the other hand, when the prediction mode is determined to be the bidirectional prediction mode, the motion vector calculating unit 12 calculates a motion vector for each of the L0 direction and the L1 direction (Step S203). The predictive image generating unit 14 generates a predictive block on the basis of the two motion vectors (Step S204). Then, the quantization coefficient calculating unit 10 calculates a quantization coefficient by calculating a prediction error signal between the coding-target block and the predictive block and then quantizing a frequency signal obtained by performing orthogonal transform on the prediction error signal (Step S205). Thereafter, the variable length coding unit 18 performs variable length coding on the calculated quantization coefficient (Step S206).

The predictive vector selecting unit 15 creates the L0-direction predictive vector candidate list mvpListL0 and the L1-direction predictive vector candidate list mvpListL1 (Step S207). Then, the prediction error calculating unit 16 calculates a difference vector between the L0-direction motion vector and each of the predictive vector candidates (Step S208). The selecting information setting unit 17 obtains, as predictive vector selection information, the flag mvpL0flag indicating the predictive vector candidate corresponding to the difference vector whose amount of information is the minimum, among the L0-direction predictive vector candidates in the L0-direction predictive vector candidate list mvpListL0 (Step S209).

Moreover, the selection information setting unit 17 rearranges the predictive vector candidates in the L1-direction candidate list mvListL1 so that the L1-direction motion vector of the block corresponding to the motion vector selected as the L0-direction predictive vector would appear first in the L1-direction candidate list mvpListL1 (Step S210). Then, the prediction error calculating unit 16 calculates a difference vector between the L1-direction motion vector and each of the predictive vector candidates (Step S211). The selection information setting unit 17 obtains, as predictive vector selection information, the flag mvpL1flag indicating the candidate having the corresponding difference vector whose amount of information is the minimum in the L1-direction candidate list mvpListL1 (Step S212). Thereafter, the variable length coding unit 18 performs, for each of the L0 direction and the L1 direction, variable length coding on the difference vector whose amount of information is the minimum, and the predictive vector selection information (Step S213). Then, the video encoder 1 terminates the video encoding process for the single block.

Note that the video encoder 1 may interchange the process in Steps S204 to S206 and the process in Steps S207 to S213, or may carry out the process in Steps S204 to S206 and the process in Steps S207 to S213 in parallel. In addition, the video encoder 1 may create an L1-direction predictive vector candidate list after obtaining each difference vector and corresponding predictive vector selection information for the L0 direction.

As described above, the video encoder increases the probability that the same code is applied to L1-direction predictive vector selection information for the block encoded in accordance with the bidirectional prediction mode. This enables a reduction of the amount of code applied to the selection information. Hence, with this video encoder, the efficiency in encoding video data is improved.

According to a modified example, the selection information setting unit 17 may rearrange the predictive vector candidates in the L1-direction candidate list mvpListL1 so that the L1-direction motion vector of the block corresponding to the motion vector selected as the L0-direction predictive vector would appear last in the candidate list mvListL1. In this case, the probability that the last vector in the candidate list mvListL1 would be the L1-direction predictive vector is high. Accordingly, the probability that the value of the flag mvpL1flag indicating the L1-direction predictive vector would be "1" is higher than the probability that the value would be "0". As a result, performing arithmetic coding on the flag mvpL1flag serving as selection information allows the amount of code applied to each flag mvpL1flag to be smaller than one bit, when the entire video is taken into account.

According to another modified embodiment, the predictive vector selecting unit 15 may select three or more motion vectors as predictive vector candidates. For example, the predictive vector selecting unit 15 may register, as predictive vector candidates, two spatial prediction vectors, a temporal prediction vector, and a zero vector, to the predictive vector candidate list. In this case, since the number of vectors registered as candidates is larger than two, an index having two bits or more is used for selection information for indicating the predictive vector.

In this case, the selection information setting unit 17 rearranges the vectors in the L1-direction candidate list so that the L1-direction motion vector of the block corresponding to the motion vector selected as the L0-direction predictive vector would appear first in the candidate list. This increases the possibility that the first vector in the L1-direction candidate list would be selected as the L1-direction predictive vector.

In this case, the variable length coding unit 18 determines the value of the code to be assigned to the value of the index indicating each predictive vector so that the length of the code to be assigned to the value of the index indicating the first vector in the candidate list would be the shortest. This increases the possibility that the variable length coding unit 18 selects the shortest code for the L1 direction. Accordingly, even when selection information is encoded with Huffman code, the code amount of the flag mvpL1flag is smaller than the case of encoding the L0-direction flag mvpL0flag and the L1-direction flag mvpL1flag independently.

According to still another modified example, the predictive vector selecting unit 15 may change the order of registering the spatial prediction vector, the temporal prediction vector, and the zero vector depending on the L0-direction predictive vector, when creating the L1-direction predictive vector candidate list. For example, when the L0-direction predictive vector is a temporal prediction vector, the predictive vector selecting unit 15 may first register a temporal prediction vector to the L1-direction prediction-vector candidate list, and then register a spatial prediction vector and a zero vector in this order as necessary. When the L0-direction predictive vector is a zero vector, the predictive vector selecting unit 15 may first register the zero vector to the L1-direction prediction-vector candidate list, and then register the spatial prediction vector and the temporal prediction vector in this order as necessary. When the L0-direction predictive vector is a spatial prediction vector, the predictive vector selecting unit 15 may register the L1-direction predictive vector candidates in the same order as that in the above-described embodiment. The steps of registering the spatial prediction vector, the temporal prediction vector, and the zero vector may be the same as those in the above-described embodiment.

In this modified example, the candidate having the strongest possibility of being selected as the L1-direction predictive vector is registered first to the predictive vector candidate list. For this reason, as in the above-described embodiment, the video encoder enables a reduction of the amount of the code applied to the L1-direction predictive vector selection information. In addition, in this modified example, the video encoder registers the candidates from the one having the strongest possibility of being selected as the predictive vector, to the predictive vector candidate list. This reduces the possibility that the candidate having the strongest possibility of being selected is missing from the candidate list.

According to still another modified example, when the L0-direction predictive vector is a spatial prediction vector, the predictive vector selecting unit 15 registers L1-direction spatial prediction blocks to the candidate list from the block closest to the block corresponding to the spatial prediction vector selected as the L0-direction predictive vector.

Figure 7:
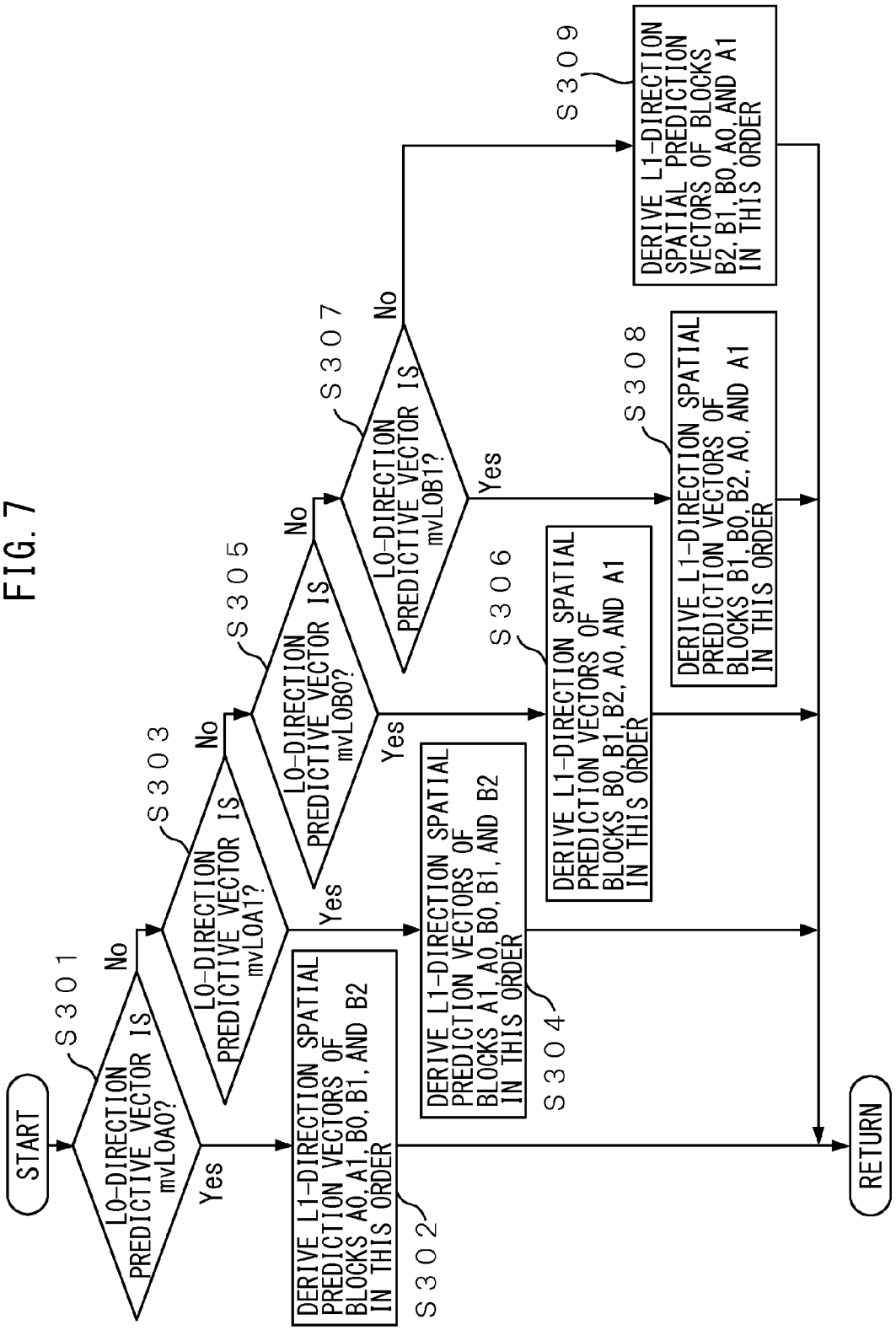
FIG. 7 is a flowchart illustrating steps for determining an order of registering L1-direction spatial prediction blocks on the basis of the block corresponding to predictive vector selected for an L0 direction.

FIG. 7 is a flowchart illustrating the steps of determining the order of registering L1-direction spatial prediction blocks, on the basis of the block corresponding to the predictive vector selected for the L0 direction. The predictive vector selecting unit 15 judges whether or not the predictive vector selected for the L0 direction is a motion vector mvL0A0 of the block A0 illustrated in FIG. 4 (Step S301). When the predictive vector is the motion vector mvL0A0 (Yes in Step S301), the predictive vector selecting unit 15 registers the L1-direction spatial prediction vectors of the blocks A0, A1, B0, B1, and B2 in this order (Step S302).

On the other hand, when the predictive vector is not the motion vector mvL0A0 (No in Step S301), the predictive vector selecting unit 15 judges whether or not the predictive vector selected for the L0 direction is a motion vector mvL0A1 of the block A1 (Step S303). When the predictive vector is the motion vector mvL0A1 (Yes in Step S303), the predictive vector selecting unit 15 registers the L1-direction spatial prediction vectors of the blocks A1, A0, B0, B1, and B2 in this order (Step S304).

When the predictive vector is not the motion vector mvL0A1 (No in Step S303), the predictive vector selecting unit 15 judges whether or not the predictive vector selected for the L0 direction is a motion vector mvL0B0 of the block B0 (Step S305). When the predictive vector is the motion vector mvL0B0 (Yes in Step S305), the predictive vector selecting unit 15 registers the L1-direction spatial prediction vectors of the blocks B0, B1, B2, A0, and A1 in this order (Step S306).

When the predictive vector is not the motion vector mvL0B0 (No in Step S305), the predictive vector selecting unit 15 judges whether or not the predictive vector selected for the L0 direction is a motion vector mvL0B1 of the block B1 (Step S307). When the predictive vector is the motion vector mvL0B1 (Yes in Step S307), the predictive vector selecting unit 15 registers the L1-direction spatial prediction vectors of the blocks B1, B0, B2, A0, and A1 in this order (Step S308).

When the predictive vector is not the motion vector mvL0B1 (No in Step S307), the predictive vector selected for the L0 direction is a motion vector mvL0B2 of the block B2. In this case, the predictive vector selecting unit 15 registers the L1-direction spatial prediction vectors of the blocks B2, B1, B0, A0, and A1 in this order (Step S309).

In this modified example, when a spatial prediction vector is selected as the L0-direction predictive vector, the candidate corresponding to the block having the strongest possibility of being selected as the predictive vector is registered first to the L1-direction predictive vector candidate list, as an L1-direction spatial prediction vector. Accordingly, the video encoder enables a reduction of a possibility that the candidate having the strongest possibility of being selected as the predictive vector is missing from the list.

Alternatively, the predictive vector selecting unit 15 may register the L1-direction spatial prediction blocks in the order from the block closest to the block corresponding to the L0-direction predictive vector in terms of Euclidean distance, among the multiple blocks to be registered as spatial prediction vectors.

According to still another modified example, when the L0-direction predictive vector is a spatial prediction vector, the predictive vector selecting unit 15 may change the method of deriving an L1-direction spatial prediction vector, on the basis of the coding information of the block corresponding to the L0-direction spatial prediction vector.

In this modified example, the predictive vector selecting unit 15 sets the block corresponding to the L0-direction predictive vector as a block to be considered first, among the blocks adjacent to the coding-target block. Then, in accordance with the steps in the flowchart illustrated in FIG. 7, the predictive vector selecting unit 15 determines the order of the blocks to be considered next and thereafter. Alternatively, the predictive vector selecting unit 15 may determine the order of the blocks to be considered next and thereafter so that the blocks would be considered from the one corresponding to the difference vector whose amount of information is the smallest, the difference vector being calculated for the L1-direction motion vector.

Figure 8:
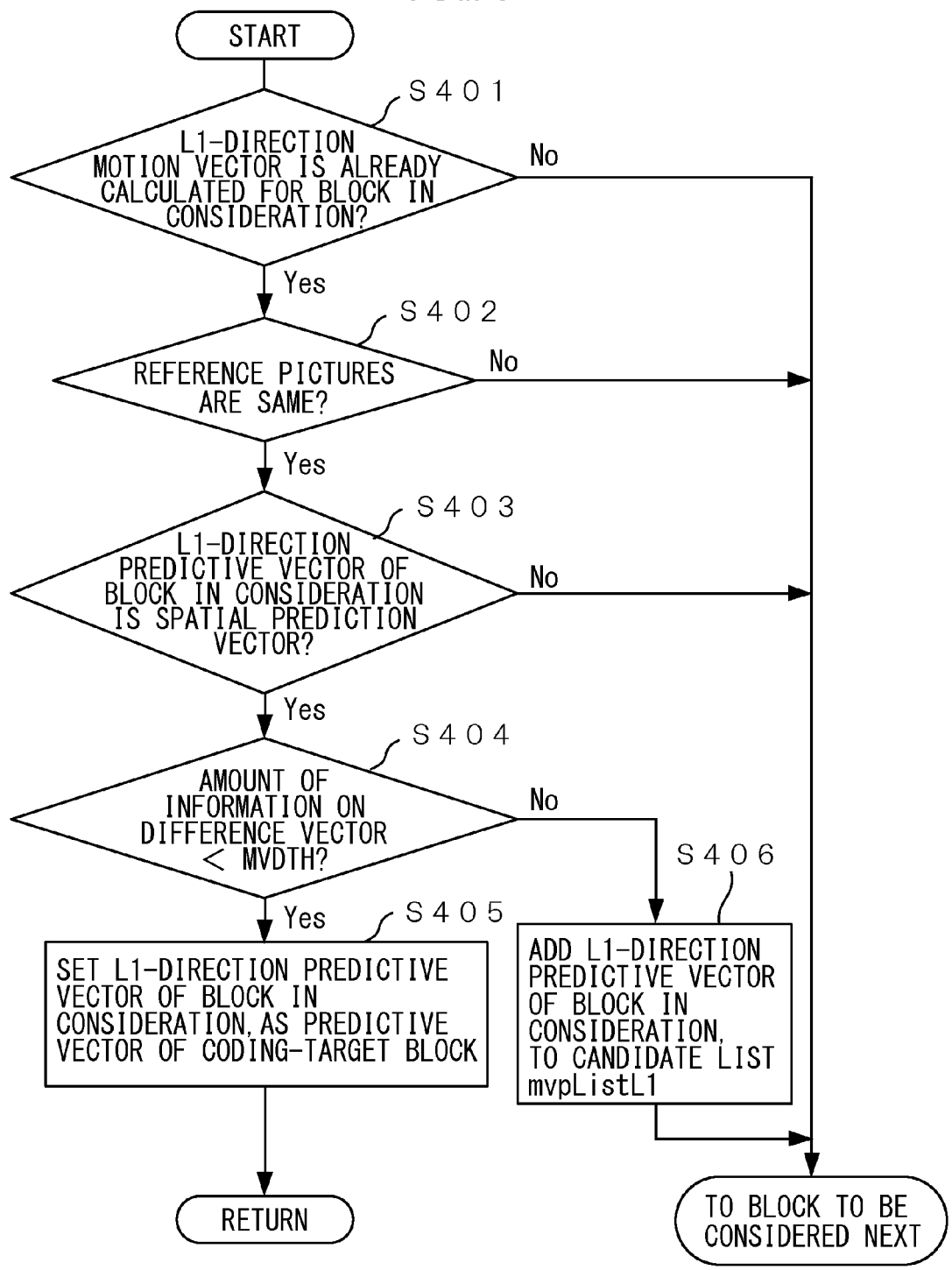
FIG. 8 is a flowchart illustrating steps for deriving a spatial prediction vector, according to a modified example.

FIG. 8 is a flowchart illustrating the steps of deriving a spatial prediction vector, according to this modified example. The predictive vector selecting unit 15 judges whether or not an L1-direction motion vector is calculated for a block in consideration among the blocks (A0, A1, B0, B1, and B2 in FIG. 4) adjacent to the coding-target block (Step S401). When the L1-direction motion vector is not calculated (No in Step S401), the predictive vector selecting unit 15 terminates the process without setting a predictive vector candidate from the block in consideration, and then carries out the process from Step S401 for the next block.

On the other hand, when the L1-direction motion vector is calculated (Yes in Step S401), the predictive vector selecting unit 15 judges whether or not the reference picture of the coding-target block and the reference picture of the block in consideration are the same in terms of the L1 direction (Step S402). When the reference picture of the coding-target block and the reference picture of the block in consideration are different (No in Step S402), the predictive vector selecting unit 15 terminates the process without setting a predictive vector candidate from the block in consideration. Then, the predictive vector selecting unit 15 carries out the process from Step S401 for the next block.

On the other hand, when the reference picture of the coding-target block and the reference picture of the block in consideration are the same (Yes in Step S402), the predictive vector selecting unit 15 judges whether or not the L1-direction predictive vector of the block in consideration is a spatial prediction vector (Step S403). When the L1-direction predictive vector of the block in consideration is not a spatial prediction vector (No in Step S403), the predictive vector selecting unit 15 terminates the process without setting a predictive vector candidate from the block in consideration. Then, the predictive vector selecting unit 15 carries out the process from Step S401 for the next block.

When the L1-direction predictive vector of the block in consideration is a spatial prediction vector (Yes in Step S403), the predictive vector selecting unit 15 judges whether or not the amount of information on the L1-direction difference vector of the block in consideration is smaller than a threshold value MVDTH (Step S404). The threshold value MVDTH is set at the maximum value of error in a motion vector, in such an extent that viewers would not notice the deterioration of the image, e.g., 1.

When the amount of information on the difference vector is smaller than the threshold value MVDTH (Yes in Step S404), the predictive vector selecting unit 15 sets the L1-direction motion vector of the block in consideration, as the L1-direction predictive vector of the coding-target block (Step S405). Then, the predictive vector selecting unit 15 terminates the process of deriving a predictive vector. When the L1-direction motion vector of the block that is considered first is set as the predictive vector, a video decoder is capable of identifying the L1-direction predictive vector of the coding-target block even when the flag mvpL1flag serving as predictive vector selection information is not transmitted to the video decoder. Thus, this modified example allows the L1-direction selection information not to be set, and consequently allows the flag mvpL1flag to not be encoded. In addition, this modified example allows the video encoder 1 to not encode the difference vector, by assuming that the predictive vector and the motion vector are the same. Hence, with this modified example, the coding efficiency is further improved.

On the other hand, when the amount of information on the difference vector is equal to or larger than the threshold value MVDTH (No in Step S404), the predictive vector selecting unit 15 adds the L1-direction motion vector of the block in consideration, to the predictive vector candidate list mvpListL1 (Step S406). Thereafter, the predictive vector selecting unit 15 carries out the process from step S401, for the block to be considered next. When a block whose amount of information on the corresponding difference vector is smaller than the threshold value MVDTH, is found among the blocks considered for deriving a spatial prediction vector, the predictive vector selecting unit 15 terminates the process of deriving a predictive vector, at this stage. Subsequently, the selection information setting unit 17 sets the L1-direction flag mvpL1flag as in the above-described embodiment. Then, the variable length coding unit 18 performs variable length coding on the flag mvpL1flag.

According to still another example, the variable length coding unit 18 may change variable length code to be applied to each of the vectors in the L1-direction predictive vector candidate list, instead of rearranging the vectors on the basis of the L1-direction selection information. For example, as long as the L1-direction motion vector of the block corresponding to the predictive vector selected for the L0 direction is registered to the L1-direction predictive vector candidate list, the variable length coding unit 18 assigns the shortest code to the motion vector. In this case, when the selection information is represented by a flag indicating the position of the motion vector in the candidate list, the value of the flag indicating the position of the L1-direction motion vector of the block corresponding to the predictive vector selected for the L0 direction, in the L1-direction candidate list, may just be set at "0". This increases the possibility that the 1.5 shortest code would be selected as information indicating the L1-direction predictive vector, thereby improving the coding efficiency. Further, even when arithmetic coding is performed on the selection information, the possibility that particular code (e.g., "0") would be selected for the L1 direction increases. In this way, the variable length coding unit 18 enables a reduction of the amount of code for L1-direction selection information of each block to be subjected to the bidirectional prediction to less than one bit, when the entire video data is taken into account.

Figure 9:
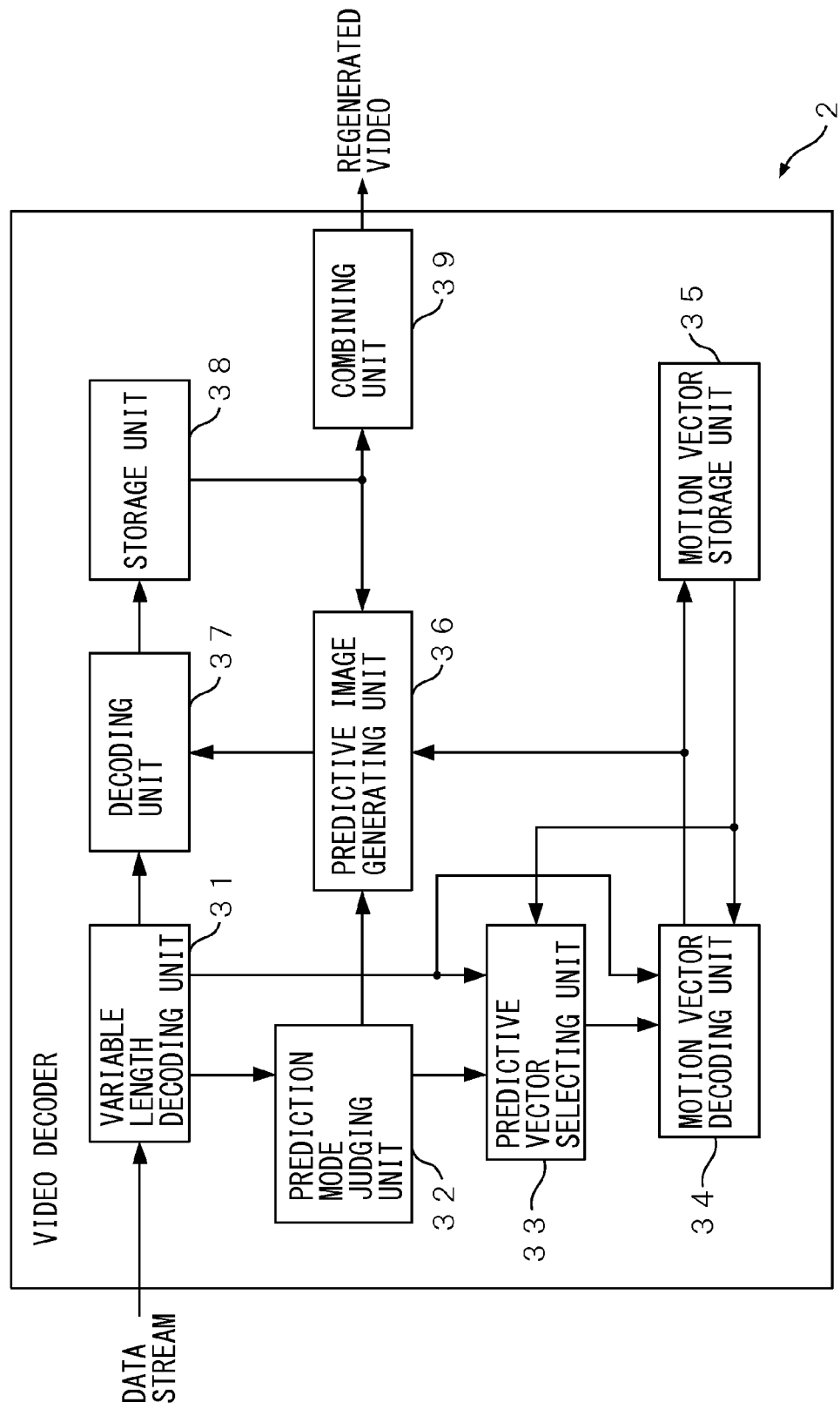
FIG. 9 is a diagram illustrating in simplified form the configuration of a video decoder that decodes video data encoded by the video encoder according to any one of the embodiment and the modified examples thereof.

FIG. 9 is a diagram illustrating in simplified form the configuration of a video decoder that decodes video data encoded by the video encoder according to any one of the above-described embodiment and modified examples. A video decoder 2 includes a variable length decoding unit 31, a prediction mode judging unit 32, a predictive vector selecting unit 33, a motion vector decoding unit 34, a motion vector storage unit 35, a predictive image generating unit 36, a decoding unit 37, a storage unit 38, and a combining unit 39. The units included in the video decoder 2 are formed individually as separate circuits. Alternatively, the units included in the video decoder 2 may be mounted on the video decoder 2, as a single integrated circuit with the circuits corresponding to the respective units, integrated therein. Further, the units included in the video decoder 2 may be function modules that are implemented by a computer program executed on a processor included in the video decoder 2.

The video decoder 2 acquires a data stream including encoded video data, via a communication network and an interface circuit for connecting the video decoder 2 to the communication network. Then, the video decoder 2 stores the data stream in a buffer memory (not illustrated). The video decoder 2 reads out the encoded video data from the buffer memory on a block-by-block basis, each block being used as the unit for encoding, and then inputs the data to the variable length decoding unit 31 on a block-by-block basis.

The variable length decoding unit 31 performs variable length decoding on the data encoded on a block-by-block basis. The variable length decoding unit 31 regenerates the quantization coefficient, which is a coefficient obtained by quantizing the frequency signal obtained by performing orthogonal transformation on each prediction error signal. Moreover, when the decoding-target block is a block inter-coded in the inter-coding mode, the variable length decoding unit 31 performs variable length decoding on the motion vector selection information and the difference vector of the block. Thereafter, the variable length decoding unit 31 passes the regenerated selection information to the predictive vector selecting unit 33, and passes the regenerated difference vector to the motion vector decoding unit 34. In addition, the variable length decoding apparatus 31 passes the quantization coefficient to the decoding unit 37.

The predictive mode judging unit 32 identifies the prediction mode applied to the decoding-target block, on the basis of header information included in the encoded video data. Then, the prediction mode judging unit 32 notifies the predictive vector selecting unit 33 and the predictive image generating unit 36 of the applied prediction mode.

The predictive vector selecting unit 33 creates a predictive vector candidate list by carrying out a similar process to that carried out by the predictive vector selecting unit 15 of the video encoder 1. Then, on the basis of the selection information notified by the variable length decoding unit 31, the predictive vector selecting unit 33 identifies a predictive vector from among the vectors registered to the candidate list.

When the decoding-target block is encoded in the bidirectional prediction mode, the predictive vector selecting unit 33 refers to corresponding L0-direction selection information. Then, the predictive vector selecting unit 33 judges whether or not the L1-direction selection information is predetermined code indicating that the candidate vector determined on the basis of the L1-direction motion vector of the block corresponding to the L0-direction predictive vector is the L1-direction predictive vector. Thereby, the predictive vector selecting unit 33 identifies the L1-direction predictive vector from among the multiple L1-direction predictive vector candidates.

For example, as the predictive vector selecting unit 15 of the video encoder 1, the predictive vector selecting unit 33 rearranges the vectors registered to the L1-direction candidate list. Specifically, the predictive vector selecting unit 33 rearranges the vectors so that the L1-direction motion vector of the block corresponding to the motion vector selected as the L0-direction predictive vector would be the first in the candidate list. Then, the predictive vector selecting unit 33 identifies the predictive vector from the rearranged candidate list, on the basis of the L1-direction selection information.

As in one of the modified examples of the video encoder 1, the predictive vector selecting unit 33 may register first the motion vector of the block corresponding to the L0-direction predictive vector, to the L1-direction predictive vector candidate list. Alternatively, when the video encoder 1 has identified each predictive vector in accordance with the steps in the flowchart illustrated in FIG. 8, the predictive vector selecting unit 33 may also identify the predictive vector in accordance with the steps in the same flowchart.

Moreover, in one of the modified example, the variable length coding unit 18 of the video encoder 1 changes the code to be applied to each L1-direction candidate vector, on the basis of the L0-direction predictive vector selection information. In this case, the predictive vector selecting unit 33 may also change the L1-direction candidate vector corresponding to the decoded code, on the basis of the L0-direction predictive vector selection information.

The predictive vector selecting unit 33 notifies the motion vector decoding unit 34 of the information indicating the identified predictive vector.

The motion vector decoding unit 34 reads out, from the motion vector storage unit 35, the motion vector of the decoded block, the motion vector being identified as the predictive vector, on the basis of the information indicating the identified predictive vector. Then, the motion vector decoding unit 34 decodes the motion vector of the decoding-target block by adding the corresponding difference vector to the motion vector thus read out. Thereafter, the motion vector decoding unit 34 outputs the decoded motion vector to the predictive image generating unit 36, and also stores the decoded motion vector in the motion vector storage unit 35.

The motion vector storage unit 35 stores the motion vector of the decoded block while there is a possibility that the motion vector would be referred to as a predictive vector.

The predictive image generating unit 36 carries out a similar process to that carried out by the predictive image generating unit 14 of the video encoding unit 1, and thereby generates a predictive block in accordance with the prediction mode applied to the decoding-target block. Then, the predictive image generating unit 36 passes the generated predictive block to the decoding unit 37.

The decoding unit 37 performs inverse quantization by multiplying the quantization coefficient, which is received from the variable length decoding unit 31, by a predetermined number corresponding to the quantization width determined on the basis of the quantization parameter acquired from the header information included in the encoded video data. Through this inverse quantization, the frequency signal of the decoding-target block, e.g., the set of DCT coefficients, is reconstructed. Subsequently, the decoding unit 37 carries out an inverse orthogonal transform process on the frequency signal. By carrying cut the inverse quantization process and the inverse orthogonal transform process for the quantization coefficient, the prediction error signal is regenerated.

The decoding unit 37 regenerates the decoding-target block by adding, for each of the pixels of the predictive block, the regenerated prediction error signal corresponding to the pixel, to the pixel value. Then, the decoding unit 37 regenerates each picture by combining the regenerated blocks of the picture in the order of encoding. The decoding unit 37 stores the regenerated picture in the storage unit 38.

The storage unit 38 temporarily stores the picture received from the decoding unit 37. Then, the storage unit 38 provides the picture as a reference picture, to the predictive image generating unit 36. Moreover, the storage unit 38 outputs the picture to the combining unit 39. The storage unit 38 stores a predetermined number of pictures, and discards the pictures from the one encoded first, when the amount of data stored in the storage unit 38 exceeds the amount corresponding to the predetermined number.

The combining unit 39 regenerates the video data by rearranging the regenerated pictures in the chronological order. Then, the combining unit 39 outputs the regenerated video data. The outputted video data is stored in a storage device (not illustrated), for example. Alternatively, the outputted video data is displayed on a display device (not illustrated) connected to the video decoder 2.

Figure 10:
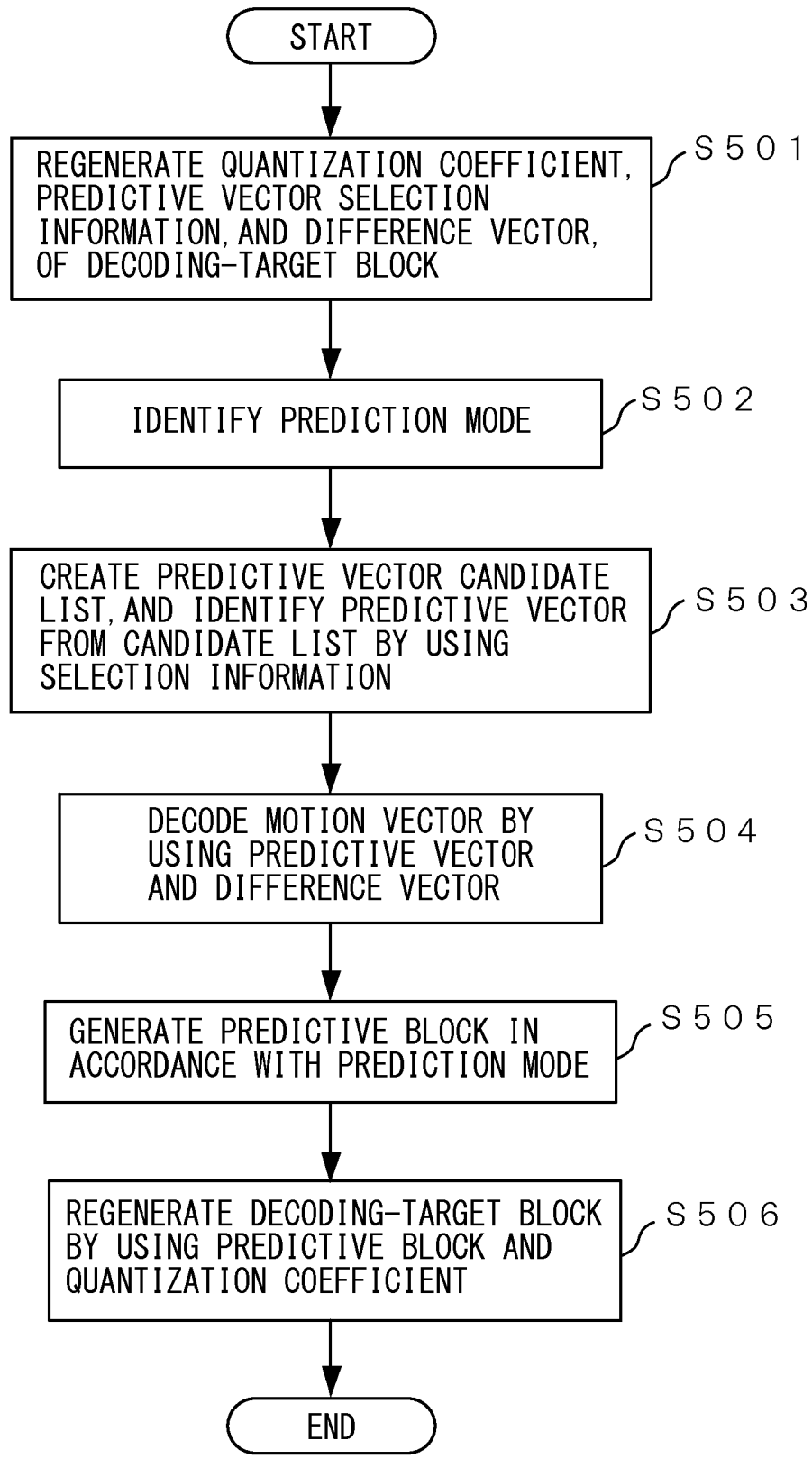
FIG. 10 is an operation flowchart illustrating a video decoding process.

FIG. 10 is an operation flowchart illustrating a video decoding process carried out by the video decoder 2. The video decoder 2 carries out the video decoding process illustrated in FIG. 10, for each decoding-target block.

The variable length decoding unit 31 regenerates the quantization coefficient, the predictive vector selection information, and the difference vector of the decoding-target block by performing variable length decoding on the encoded data on the block (Step S501).

Then, the prediction mode judging unit 32 identifies the prediction mode applied to the decoding-target block, on the basis of the header information included in the encoded video data (Step S502). Thereafter, the prediction mode judging unit 32 notifies the predictive image generating unit 36 of the predictive mode applied to the decoding-target block.

The predictive vector selecting unit 33 creates a predictive vector candidate list, and then identifies the predictive vector from among the vectors registered to the candidate list, on the basis of the selection information notified by the variable length decoding unit 31 (Step S503).

The motion vector decoding unit 34 reads out, from the motion vector storage unit 35, the motion vector of the decoded block, the motion vector being identified as the predictive vector. Then, the motion vector decoding unit 34 decodes the motion vector of the decoding-target block by adding the difference vector to the motion vector thus read out (Step S504).

Thereafter, the predictive image generating unit 36 generates a predictive block on the basis of the prediction mode applied to the decoding-target block (Step S505).

The decoding unit 37 performs inverse quantization by multiplying the quantization coefficient received from the variable length decoding unit 31 by a predetermined number corresponding to the quantization width determined on the basis of the quantization parameter acquired from the header information included in the encoded video data. Then, the decoding unit 37 regenerates the prediction error signal by carrying out an inverse orthogonal transform process on the frequency signal. Thereafter, the decoding unit 37 regenerates the decoding-target block by adding, to the pixel value, the regenerated prediction error signal corresponding to the pixel, for each of the pixels of the predictive block (Step S506). Then, the decoding unit 37 regenerates each picture by combining the regenerated blocks of each picture in the order of encoding. The decoding unit 37 stores the regenerated picture in the storage unit 38. Thereafter, the video decoder 2 terminates the video decoding process for each decoding-target block.

Figure 11:
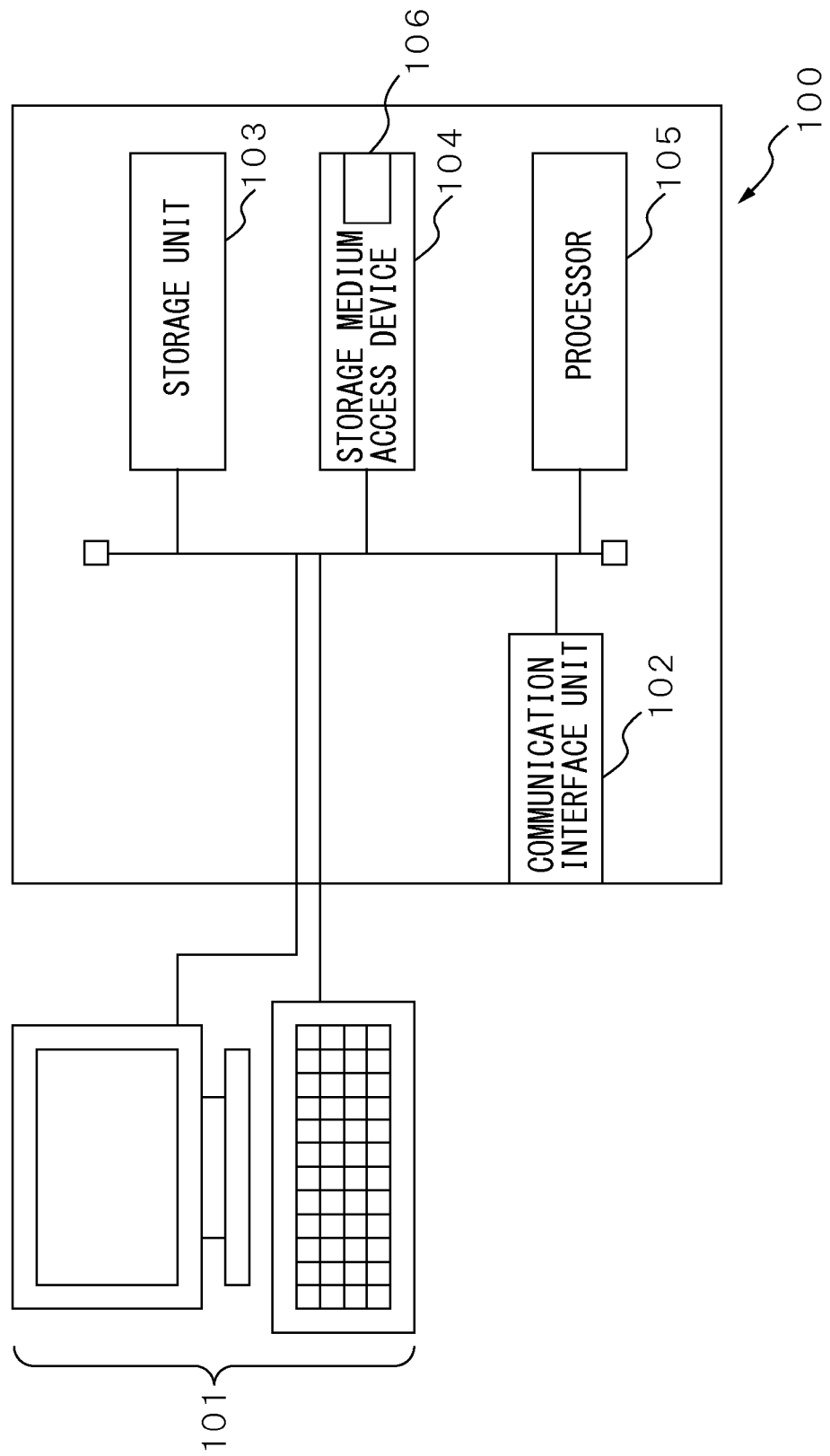
FIG. 11 is a diagram illustrating the configuration of a computer that operates as a video encoder or a video decoder when a computer program for implementing the functions of the units of the video encoder or the video decoder according to any one of the embodiment and the modified examples thereof operates.

FIG. 11 is a diagram illustrating the configuration of a computer that operates as a video encoder or a video decoder when a computer program for implementing the functions of the units in the video encoder or the video decoder according to any one of the embodiment and the modified examples thereof operates.

A computer 100 includes a user interface unit 101, a communication interface unit 102, a storage unit 103, a storage medium access device 104, and a processor 105. The processor 105 is connected to the user interface unit 101, the communication interface unit 102, the storage unit 103, and the storage medium access device 104, via a bus, for example.

The user interface unit 101 includes input devices such as a keyboard and a mouse, and a display device such as a liquid crystal display, for example. Alternatively, the user interface unit 101 may include a device in which an input device and a display device are integrated, such as a touch panel display. The user interface unit 101 outputs, to the processor 105, an operation signal for selecting video data to be encoded or encoded video data to be decoded, in response to a user operation, for example. The user interface unit 101 may also display the decoded video data received from the processor 105.

The communication interface unit 102 may include a communication interface for connecting the computer 100 to a device for generating video data, such as a video camera, and a control circuit therefor. The communication interface may be a universal serial bus (USB), for example.

Moreover, the communication interface unit 102 may include a communication interface for connecting the computer 100 to a communication network conforming to a communication standard such as Ethernet (registered trademark).

In this case, the communication interface unit 102 acquires video data to be encoded or encoded video data to be decoded, from other equipment connected to the communication network, and then passes the video data to the processor 105. The communication interface unit 102 may output the encoded video data or the decoded video data received from the processor 105, to other equipment via the communication network.

The storage unit 103 includes a read/write semiconductor memory and a read-only semiconductor memory. The storage unit 103 stores a computer program to be executed on the processor 105 to carry out the video encoding process or the video decoding process, and data generated during and as a result of the process.

The storage medium access device 104 is a device for accessing a storage medium 106 such as a magnetic disc, a semiconductor memory card, or an optical storage medium, for example. The storage medium accessing device 104 reads out a computer program for the video encoding process or the video decoding process, the computer program being stored in the storage medium 106 and executed on the processor 105, and then passes the program to the processor 105.

The processor 105 generates encoded video data by executing the computer program for the video encoding process according to any one of the above-described embodiment and modified examples. Then, the processor 105 stores the encoded video data thus generated, in the storage unit 103, or outputs the encoded video data to another equipment via the communication interface unit 102. In addition, the processor 105 decodes the encoded video data by executing the computer program for the video decoding process according to any one of the above-described embodiment and modified examples. Then, the processor 105 stores the decoded video data in the storing unit 103, displays the decoded video data on the user interface unit 101, or outputs the decoded video data to other equipment via the communication interface unit 102.

The computer program capable of implementing the functions of the units in the video encoder 1 may be provided in the form recorded on a medium readable by the computer. Similarly, the computer program capable of implementing the functions of the units in the video decoder 2 may be provided in the form recorded on a medium readable by the computer. However, note that such a recording medium does no include any carrier.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A video encoder that encodes, in a bidirectional prediction mode, a coding-target block among a plurality of blocks obtained by dividing a coding-target picture included in video data, the video encoder comprising:

a motion vector calculating unit that calculates, for the coding-target block, a first motion vector representing an amount of spatial movement between a reference region in a first reference picture positioned in a first direction from the coding-target picture and the coding-target block, and that calculates, for the coding-target block, a second motion vector representing an amount of spatial movement between a reference region in a second reference picture positioned in a second direction from the coding-target picture and the coding-target block;

a predictive vector selecting unit that, from among motion vectors calculated for respective blocks encoded before the coding-target block, selects a plurality of candidates for a first predictive vector for predicting the first motion vector and a plurality of candidates for a second predictive vector for predicting the second motion vector;

a prediction error calculating unit that calculates first difference vectors representing errors between the first motion vector and respective candidates for the first predictive vector, and that calculates second difference vectors representing errors between the second motion vector and respective candidates for the second predictive vector;

a selection information setting unit that sets first selection information for identifying, as a first predictive vector in the first difference vectors, a candidate corresponding to the first difference vector whose amount of information is the smallest, from among the plurality of candidates for the first predictive vector, and that sets second selection information for identifying, as the second predictive vector, a candidate corresponding to a second difference vector in the second difference vectors whose amount of information is the smallest, from among the plurality of candidates for the second predictive vector; and a variable length coding unit that performs variable length coding on the first selection information and the second selection information, wherein the video encoder applies, on the basis of the first selection information, predetermined code to the second selection information representing that the second predictive vector is a candidate determined on the basis of a motion vector in the second direction for the encoded block corresponding to the first predictive vector, from among the plurality of candidates for the second predictive vector.

2. The video encoder according to claim 1, wherein a length of the predetermined code is equal to or shorter than a length of code applied to the second selection information representing that the second predictive vector is a candidate determined on the basis of a motion vector in the second direction, of a block different from the encoded block corresponding to the first predictive vector, from among the plurality of candidates for the second predictive vector.

3. The video encoder according to claim 1, wherein
the selection information setting unit creates a list of the plurality of candidates for the second predictive vector, and rearranges the candidates for the second predictive vector in the list so that the candidate for the second predictive vector determined on the basis of the motion vector in the second direction, of the encoded block corresponding to the first predictive vector would be in a predetermined position in the list, and
the second selection information represents the position of the second predictive vector in the list, and the predetermined code is applied to the second selection information representing the predetermined position.

4. The video encoder according to claim 1, wherein, when the motion vector in the second direction, of the encoded block corresponding to the first predictive vector is obtained, the selection information setting unit creates a list of the plurality of candidates for the second predictive vector so that the motion vector is registered to be positioned first in the list.

5. The video encoder according to claim 4, wherein, when the encoded block corresponding to the first predictive vector is part of a picture encoded before the coding-target picture and a motion vector in the second direction, of the encoded block is obtained, the selection information setting unit registers the motion vector to be positioned first in the list of the plurality of candidates for the second predictive vector, and registers a motion vector in the second direction, of the encoded block adjacent to the coding-target block in the coding-target picture to be positioned second or later in the list.

6. The video encoder according to claim 4, wherein, when the encoded block corresponding to the first predictive vector is one of the plurality of blocks of the coding-target picture, the selection information setting unit judges, for each of the plurality of blocks of the coding-target picture that are possible to select as the second predictive vector, whether or not a motion vector, in the second direction, of the block qualifies as one of the plurality of candidates for the second predictive vector, the plurality of blocks being judged in an order of distance from a block closest to the encoded block corresponding to the first predictive vector, and when the motion vector qualifies as one of the candidates for the second predictive vector, registers the motion vector positioned first in the list of the plurality of candidates for the second predictive vector.

7. The video encoder according to claim 6, wherein the selection information setting unit does not set the second selection information when the motion vector, in the second direction, of the encoded block corresponding to the first predictive vector among the plurality of blocks of the coding-target picture which are possible to select as the second predictive vector, refers to the second reference picture and when the amount of information on the second difference vector of the encoded block is so small that image quality would not be affected even when the motion vector of the encoded block is selected as the second motion vector.

8. The video encoder according to claim 1, wherein
the selection information setting unit creates a list of the plurality of candidates for the second predictive vector, and
the variable length coding unit applies the predetermined code to the second selection information representing a position, in the list, of the second predictive vector determined on the basis of the motion vector in the second direction, of the encoded block corresponding to the first predictive vector.

9. A video encoding method for encoding a coding-target block among a plurality of blocks obtained by dividing a coding-target picture included in video data, in a bidirectional prediction mode, the video encoding method comprising:

calculating, for the coding-target block, a first motion vector representing an amount of spatial movement between a reference region in a first reference picture positioned in a first direction from the coding-target picture and the coding-target block, and calculating, for the coding-target block, a second motion vector representing an amount of spatial movement between a reference region in a second reference picture positioned in a second direction from the coding-target picture and the coding-target block;

selecting, from among motion vectors calculated for respective blocks encoded before the coding-target block, a plurality of candidates for a first predictive vector for predicting the first motion vector and a plurality of candidates for a second predictive vector for predicting the second motion vector;

calculating first difference vectors representing errors between the first motion vector and respective candidates for the first predictive vector, and calculating second difference vectors representing errors between the second motion vector and respective candidates for the second predictive vector;

setting first selection information for identifying, as the first predictive vector, a candidate corresponding to a first difference vector whose amount of information is the smallest in the first difference vectors, from among the plurality of candidates for the first predictive vector, and setting second selection information for identifying, as the second predictive vector, a candidate corresponding to a second difference vector whose amount of information is the smallest in the second difference vectors, from among the plurality of candidates for the second predictive vector;

performing variable length coding on the first selection information and the second selection information; and applying, on the basis of the first selection information, predetermined code to the second selection information representing that the second predictive vector is a candidate determined on the basis of a motion vector in the second direction for the encoded block corresponding to the first predictive vector, from among the plurality of candidates for the second predictive vector.

10. The video encoding method according to claim 9, wherein a length of the predetermined code is equal to or shorter than a length of code applied to the second selection information representing that the second predictive vector is a candidate determined on the basis of a motion vector in the second direction, of a block different from the encoded block corresponding to the first predictive vector, from among the plurality of candidates for the second predictive vector.

11. The video encoding method according to claim 9, wherein
the setting the second selection information creates a list of the plurality of candidates for the second predictive vector, and rearranges the candidates for the second predictive vector in the list so that the candidate for the second predictive vector determined on the basis of the motion vector in the second direction, of the encoded block corresponding to the first predictive vector would be in a predetermined position in the list, and
the second selection information represents the position of the second predictive vector in the list, and the predetermined code is applied to the second selection information representing the predetermined position.

12. The video encoding method according to claim 9, wherein, when the motion vector in the second direction, of the encoded block corresponding to the first predictive vector is obtained, the setting the second selection information creates a list of the plurality of candidates for the second predictive vector so that the motion vector is registered to be positioned first in the list.

13. The video encoding method according to claim 12, wherein, when the encoded block corresponding to the first predictive vector is part of a picture encoded before the coding-target picture and a motion vector in the second direction, of the encoded block is obtained, the setting the second selection information registers the motion vector to be positioned first in the list of the plurality of candidates for the second predictive vector, and registers a motion vector in the second direction, of the encoded block adjacent to the coding-target block in the coding-target picture to be positioned second or later in the list.

14. The video encoding method according to claim 12, wherein, when the encoded block corresponding to the first predictive vector is one of the plurality of blocks of the coding-target picture, the setting the second selection information judges, for each of the plurality of blocks of the coding-target picture that are possible to select as the second predictive vector, whether or not a motion vector, in the second direction, of the block qualifies as one of the plurality of candidates for the second predictive vector, the plurality of blocks being judged in an order of distance from a block closest to the encoded block corresponding to the first predictive vector, and when the motion vector qualifies as one of the candidates for the second predictive vector, registers the motion vector positioned first in the list of the plurality of candidates for the second predictive vector.

15. The video encoding method according to claim 14, wherein the setting the second selection information does not set the second selection information when the motion vector, in the second direction, of the encoded block corresponding to the first predictive vector among the plurality of blocks of the coding-target picture which are possible to select as the second predictive vector, refers to the second reference picture and when the amount of information on the second difference vector of the encoded block is so small that image quality would not be affected even when the motion vector of the encoded block is selected as the second motion vector.

16. The video encoding method according to claim 9, wherein
the setting the second selection information creates a list of the plurality of candidates for the second predictive vector, and
the performing variable length coding applies the predetermined code to the second selection information representing a position, in the list, of the second predictive vector determined on the basis of the motion vector in the second direction, of the encoded block corresponding to the first predictive vector.

17. A video decoder that decodes a decoding-target bidirectional-predictive-coded block among a plurality of blocks obtained by dividing a decoding-target picture included in encoded video data, the video decoder comprising:
a variable length decoding unit that regenerates first selection information of a first predictive vector for a first motion vector, and a first difference vector between the first motion vector and the first predictive vector, first motion vector representing an amount of spatial movement between the decoding-target block and a reference region in a first reference picture positioned in a first direction from the decoding-target picture, and that regenerates second selection information of a second predictive vector for a second motion vector, and a second difference vector between the second motion vector and the second predictive vector, the second motion vector representing an amount of spatial movement between the decoding-target block and a reference region in a second reference picture positioned in a second direction from the decoding-target picture;
a predictive vector selecting unit that
selects a plurality of candidates for the first predictive vector from among motion vectors of respective blocks decoded before the decoding-target block,
identifies the first predictive vector from among the plurality of candidates for the first predictive vector, on the basis of the first selection information,
selects a plurality of candidates for the second predictive vector from among the blocks decoded before the decoding-target block, and
identifies the second predictive vector from among the plurality of candidates for the second predictive vector by judging, on the basis of the first selection information, whether or not the second selection information is a predetermined code indicating that a candidate determined on the basis of a motion vector in the second direction, for the decoded block corresponding to the first predictive vector from among the plurality of candidates for the second predictive vector, is the second predictive vector; and
a motion vector decoding unit that decodes the first motion vector by adding the first difference vector to the first predictive vector, and the second motion vector by adding the second difference vector to the second predictive vector.

18. A video decoding method for decoding a decoding-target bidirectional-predictive-coded block among a plurality of blocks obtained by dividing a decoding-target picture included in encoded video data, the video decoding method comprising:
regenerating first selection information of a first predictive vector for a first motion vector, and a first difference vector between the first motion vector and the first predictive vector, the first motion vector representing an amount of spatial movement between the decoding-target block and a reference region in a first reference picture positioned in a first direction from the decoding-target picture, and regenerating second selection information of a second predictive vector for a second motion vector, and a second difference vector between the second motion vector and the second predictive vector, the second motion vector representing an amount of spatial movement between the decoding-target block and a reference region in a second reference picture positioned in a second direction from the decoding-target picture;

selecting a plurality of candidates for the first predictive vector from among motion vectors of respective blocks decoded before the decoding-target block;

identifying the first predictive vector from among the plurality of candidates for the first predictive vector, on the basis of the first selection information;

selecting a plurality of candidates for the second predictive vector from among the blocks decoded before the decoding-target block;

identifying the second predictive vector from among the plurality of candidates for the second predictive vector by judging, on the basis of the first selection information, whether or not the second selection information is a predetermined code indicating that a candidate determined on the basis of a motion vector in the second direction, for the decoded block corresponding to the first predictive vector from among the plurality of candidates for the second predictive vector is the second predictive vector; and decoding the first motion vector by adding the first difference vector to the first predictive vector, and the second motion vector by adding the second difference vector to the second predictive vector.

* * * * *